(12) United States Patent
Davidow

(10) Patent No.: US 7,773,361 B2
(45) Date of Patent: Aug. 10, 2010

(54) MEDIUM VOLTAGE SIGNAL COUPLING STRUCTURE FOR LAST LEG POWER GRID HIGH-SPEED DATA NETWORK

(75) Inventor: Clifford A. Davidow, Reno, NV (US)

(73) Assignee: Current Grid, LLC, Germantown, MD (US)

( * ) Notice: Subject to any disclaimer, the term of this patent is extended or adjusted under 35 U.S.C. 154(b) by 740 days.

(21) Appl. No.: 11/756,256

(22) Filed: May 31, 2007

(65) Prior Publication Data

US 2007/0222637 A1    Sep. 27, 2007

Related U.S. Application Data

(63) Continuation of application No. 10/661,034, filed on Sep. 12, 2003, now Pat. No. 7,245,472, and a continuation-in-part of application No. 10/370,086, filed on Feb. 20, 2003, now Pat. No. 7,142,094, and a continuation-in-part of application No. 10/165,451, filed on Jun. 7, 2002, now Pat. No. 7,173,935, and a continuation-in-part of application No. 09/860,260, filed on May 18, 2001, now abandoned, and a continuation-in-part of application No. 09/860,261, filed on May 18, 2001, now Pat. No. 7,194,528, and a continuation-in-part of application No. 09/860,262, filed on May 18, 2001, now Pat. No. 7,173,938, and a continuation-in-part of application No. 09/860,263, filed on May 18, 2001, now Pat. No. 6,624,532.

(60) Provisional application No. 60/411,072, filed on Sep. 16, 2002.

(51) Int. Cl.
*H02H 9/00* (2006.01)
(52) U.S. Cl. .................................... 361/118
(58) Field of Classification Search ............ 361/118
See application file for complete search history.

(56) References Cited

U.S. PATENT DOCUMENTS 1,547,242 A    7/1925    Strieby (Continued)

FOREIGN PATENT DOCUMENTS

DE    100 12 235 C2    12/2001

(Continued)

OTHER PUBLICATIONS

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992),1-11.

(Continued)

*Primary Examiner*—Stephen W Jackson
(74) *Attorney, Agent, or Firm*—Mel Barnes; Capital Legal Group, LLC

(57) ABSTRACT

A power line based communication system includes a powerline termination module, a plurality of powerline gateways, and a plurality of powerline nodes. AC coupling modules couple powerline nodes to medium voltage power lines. One AC coupling module includes a housing having an upper portion that contains a transformer and a lower portion that contains a power node. Another AC coupling module intercouples a powerline node to a test point of a dead front transformer. Still another AC coupling module employs a surge arrestor to couple signals between a powerline node and a medium voltage transmission line. Yet another AC coupling module clamps on a medium voltage power line to couple signals between a powerline node and a medium voltage power line.

32 Claims, 30 Drawing Sheets

U.S. PATENT DOCUMENTS

| | | |
|---|---|---|
| 2,577,731 A | 12/1951 | Berger |
| 3,369,078 A | 2/1968 | Stradley |
| 3,696,383 A | 10/1972 | Oishi et al. |
| 3,701,057 A | 10/1972 | Hoer |
| 3,702,460 A | 11/1972 | Blose |
| 3,810,096 A | 5/1974 | Kabat et al. |
| 3,846,638 A | 11/1974 | Wetherell |
| 3,895,370 A | 7/1975 | Valentini |
| 3,942,170 A | 3/1976 | Whyte |
| 3,962,547 A | 6/1976 | Pattantyus-Abraham |
| 4,004,110 A | 1/1977 | Whyte |
| 4,016,429 A | 4/1977 | Vercellotti et al. |
| 4,057,793 A | 11/1977 | Johnson et al. |
| 4,142,178 A | 2/1979 | Whyte et al. |
| 4,188,619 A | 2/1980 | Perkins |
| 4,254,402 A | 3/1981 | Perkins |
| 4,263,549 A | 4/1981 | Toppeto |
| 4,323,882 A | 4/1982 | Gajjer |
| 4,383,243 A | 5/1983 | Krügel et al. |
| 4,433,284 A | 2/1984 | Perkins |
| 4,466,047 A * | 8/1984 | Avocat .................. 361/303 |
| 4,481,501 A | 11/1984 | Perkins |
| 4,569,045 A | 2/1986 | Schieble et al. |
| 4,636,771 A | 1/1987 | Ochs |
| 4,652,855 A | 3/1987 | Weikel |
| 4,668,934 A | 5/1987 | Shuey |
| 4,675,648 A | 6/1987 | Roth et al. |
| 4,686,382 A | 8/1987 | Shuey |
| 4,697,166 A | 9/1987 | Warnagiris et al. |
| 4,724,381 A | 2/1988 | Crimmins |
| 4,745,391 A | 5/1988 | Gajjar |
| 4,746,897 A | 5/1988 | Shuey |
| 4,890,089 A | 12/1989 | Shuey |
| 4,973,940 A | 11/1990 | Sakai et al. |
| 5,210,519 A | 5/1993 | Moore |
| 5,257,006 A | 10/1993 | Graham et al. |
| 5,351,272 A | 9/1994 | Abraham |
| 5,485,040 A | 1/1996 | Sutterlin |
| 5,497,142 A | 3/1996 | Chaffanjon |
| 5,504,454 A | 4/1996 | Daggett et al. |
| 5,537,087 A | 7/1996 | Naito |
| 5,559,377 A | 9/1996 | Abraham |
| 5,592,354 A | 1/1997 | Nocentino, Jr. |
| 5,625,863 A | 4/1997 | Abraham |
| 5,684,450 A | 11/1997 | Brown |
| 5,694,108 A | 12/1997 | Shuey |
| 5,705,974 A | 1/1998 | Patel et al. |
| 5,717,685 A | 2/1998 | Abraham |
| 5,770,996 A | 6/1998 | Severson et al. |
| 5,818,127 A | 10/1998 | Abraham |
| 5,850,114 A | 12/1998 | Froidevaux |
| 5,856,776 A | 1/1999 | Armstrong et al. |
| 5,864,284 A | 1/1999 | Sanderson et al. |
| 5,892,430 A | 4/1999 | Wiesman et al. |
| 5,929,750 A | 7/1999 | Brown |
| 5,933,071 A | 8/1999 | Brown |
| 5,933,073 A | 8/1999 | Shuey |
| 5,949,327 A | 9/1999 | Brown |
| 5,994,998 A | 11/1999 | Fisher et al. |
| 6,014,386 A | 1/2000 | Abraham |
| 6,023,106 A | 2/2000 | Abraham |
| 6,040,759 A | 3/2000 | Sanderson |
| 6,104,707 A | 8/2000 | Abraham |
| 6,140,911 A | 10/2000 | Fisher et al. |
| 6,144,292 A | 11/2000 | Brown |
| 6,172,597 B1 | 1/2001 | Brown |
| 6,255,935 B1 | 7/2001 | Lehmann et al. |
| 6,282,405 B1 | 8/2001 | Brown |
| 6,297,730 B1 | 10/2001 | Dickinson |
| 6,396,392 B1 | 5/2002 | Abraham |
| 6,407,987 B1 | 6/2002 | Abraham |
| 6,452,482 B1 | 9/2002 | Cern |
| 6,515,485 B1 | 2/2003 | Bullock et al. |
| 6,624,532 B1 | 9/2003 | Davidow et al. |
| 6,624,745 B1 | 9/2003 | Willer |
| 6,646,447 B2 | 11/2003 | Cern et al. |
| 6,683,531 B2 | 1/2004 | Diamanti et al. |
| 6,686,832 B2 | 2/2004 | Abraham |
| 6,753,742 B2 | 6/2004 | Kim |
| 6,785,532 B1 | 8/2004 | Rickard |
| 6,809,633 B2 | 10/2004 | Cern |
| 6,844,810 B2 | 1/2005 | Cern |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,975,210 B2 | 12/2005 | Cern |
| 6,980,089 B1 | 12/2005 | Kline |
| 6,980,090 B2 | 12/2005 | Mollenkopf |
| 6,982,611 B2 | 1/2006 | Cope |
| 6,998,962 B2 | 2/2006 | Cope et al. |
| 7,042,351 B2 | 5/2006 | Kline |
| 7,046,124 B2 | 5/2006 | Cope et al. |
| 7,046,882 B2 | 5/2006 | Kline |
| 7,061,370 B2 | 6/2006 | Yehuda |
| 7,102,478 B2 | 9/2006 | Pridmore et al. |
| 7,245,472 B2 * | 7/2007 | Davidow .................. 361/118 |
| 7,248,148 B2 | 7/2007 | Kline et al. |
| 7,307,511 B2 | 12/2007 | Kline |
| 2001/0038329 A1 | 11/2001 | Diamanti et al. |
| 2001/0052843 A1 | 12/2001 | Wiesman et al. |
| 2001/0054953 A1 | 12/2001 | Kline |
| 2002/0002040 A1 | 1/2002 | Kline et al. |
| 2002/0097953 A1 | 7/2002 | Kline |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2002/0171535 A1 | 11/2002 | Cern |
| 2003/0054793 A1 | 3/2003 | Manis et al. |
| 2003/0160684 A1 | 8/2003 | Cern |
| 2003/0169155 A1 | 9/2003 | Mollenkopf et al. |
| 2003/0201759 A1 | 10/2003 | Cern |
| 2003/0201873 A1 | 10/2003 | Cern |
| 2003/0210135 A1 | 11/2003 | Cern |
| 2003/0222747 A1 | 12/2003 | Perkinson et al. |
| 2003/0222748 A1 | 12/2003 | Cern et al. |
| 2003/0232599 A1 | 12/2003 | Dostert |
| 2003/0234713 A1 | 12/2003 | Pridmore, Jr. et al. |
| 2004/0003934 A1 | 1/2004 | Cope |
| 2004/0032320 A1 | 2/2004 | Zalitzky et al. |
| 2004/0056734 A1 | 3/2004 | Davidow |
| 2004/0090284 A1 | 5/2004 | Cern |
| 2004/0104798 A1 | 6/2004 | Cern |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0142599 A1 | 7/2004 | Cope et al. |
| 2004/0183619 A1 | 9/2004 | Sugg |
| 2004/0196144 A1 | 10/2004 | Crenshaw et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2005/0046550 A1 | 3/2005 | Crenshaw et al. |
| 2005/0122092 A1 | 6/2005 | Blasco Claret et al. |
| 2005/0168326 A1 | 8/2005 | White et al. |
| 2006/0079198 A1 | 4/2006 | Sanderson |

FOREIGN PATENT DOCUMENTS

| | | |
|---|---|---|
| DE | 101 03 530 A1 | 8/2002 |
| DE | 101 19 039 A1 | 12/2002 |
| DE | 101 19 040 A1 | 12/2002 |
| EP | 0 470 185 B1 | 11/1995 |
| EP | 0 913 955 A2 | 5/1999 |
| EP | 0 948 143 A2 | 10/1999 |
| EP | 0 959 569 A1 | 11/1999 |
| EP | 0 916 194 B1 | 9/2001 |
| EP | 1 213 849 A1 | 6/2002 |
| GB | 2 331 683 A | 5/1999 |
| GB | 2 341 776 A | 3/2000 |
| JP | 1276933 | 11/1989 |
| WO | WO-92/16920 A1 | 10/1992 |
| WO | WO-98/33258 A2 | 7/1998 |
| WO | WO-00/59076 A1 | 10/2000 |
| WO | WO-00/60701 A1 | 10/2000 |
| WO | WO-01/08321 A1 | 2/2001 |
| WO | WO-01/43305 A1 | 6/2001 |
| WO | WO-03/034608 A2 | 4/2003 |
| WO | WO-03/040732 A2 | 5/2003 |

OTHER PUBLICATIONS

"Intellon Corporation Test Summary for Transformerless Coupler Study",*Intellon No News Wires*, DOT/NHTSA Order No. DTNH22-98-P-07632, (Dec. 24, 1998),1-18.

"EMETCON Automated Distribution System", *ABB Power T & D Company, Inc*, (Jan. 1990),1-14.

"Centralized Commercial Building Applications with the Lonworks® PLT-21 Power Line Transceiver", *Lonworks Engineering Bulletin, Echelon*, (Apr. 1997),1-22.

Abraham, K C., et al., "A Novel High-Speed PLC Communication Modem", *IEEE Transactions on Power Delivery*, (Oct. 1992),1760-1768.

Barstow, J M., "A Carrier Telephone System for Rural Service", *AIEE Transactions*, (1947),301-307.

Chang, SS L., "Power-Line Carrier", *Fundamentals Handbook of Electrical and Computer Engineering, vol. II-Communication, Control, Devices and Systems*, (1983),617-627.

Coakley, N G., et al., "Real-Time Control of a Servosytem Using the Inverter-Fed Power Lines to Communicate Sensor Feedback", *IEEE Transactions on Industrial Electronics*, (1999),360-369.

Lim, C K., et al., "Development of a Test Bed for High-Speed Power Line Communications",*School of Electrical and Electronic Engineering, Nanyang Technological University, Singapore, IEEE*, (2000),451-456.

Naredo, J L., et al., "Design of Power Line Carrier Systems on Multitransposed Delta Transmission Lines", *IEEE Transactions on Power Delivery*, (1991),952-958.

"Demand Side Management with LONWORKS® Power Line Transceivers", *LONWORKS Engineering Bulletin*, (Dec. 1996),1-36.

"Summary of an IEEE Guide for Power-Line Carrier Applications", *IEEE Transactions on Power Apparatus and Systems*, (Nov./Dec. 1980),2334-2337.

Hasler, E F., et al., "Communication Systems Using Bundle Conductor Overhead Power Lines", *IEEE Transactions on Power Apparatus and Systems*, (Mar./Apr. 1975),344-349.

"IEEE Guide for Power-Line Carrier Applications, ANSI/IEEE Std 643-1980", *The Institute of Electrical and Electronics Engineers, Inc.*, (1980),1-80.

* cited by examiner

*fiber to house along with powerlines*

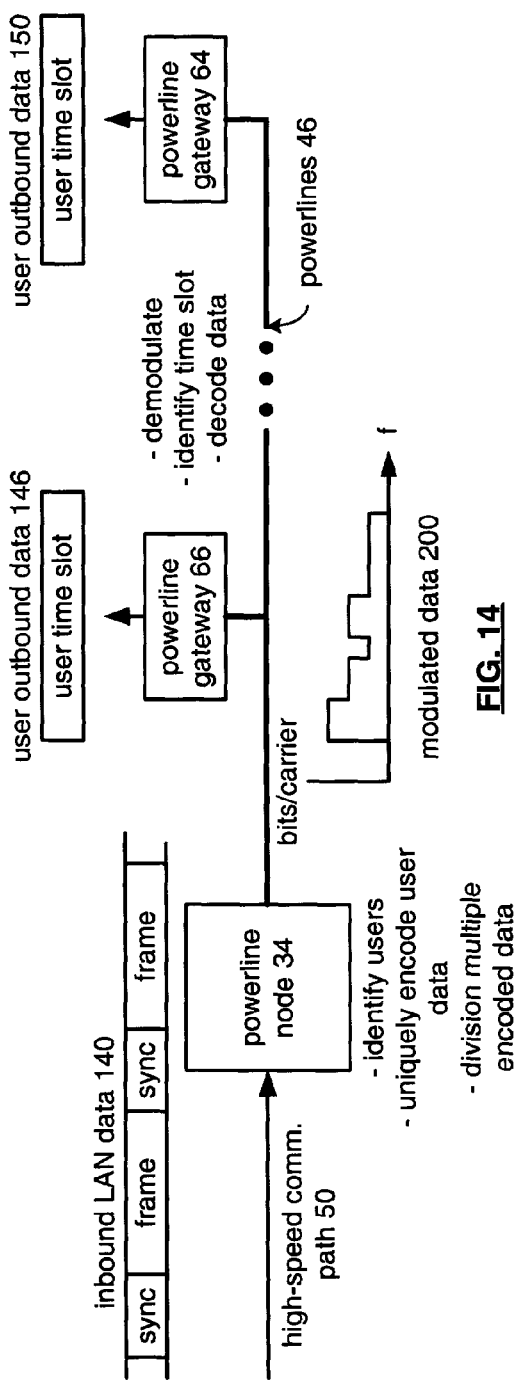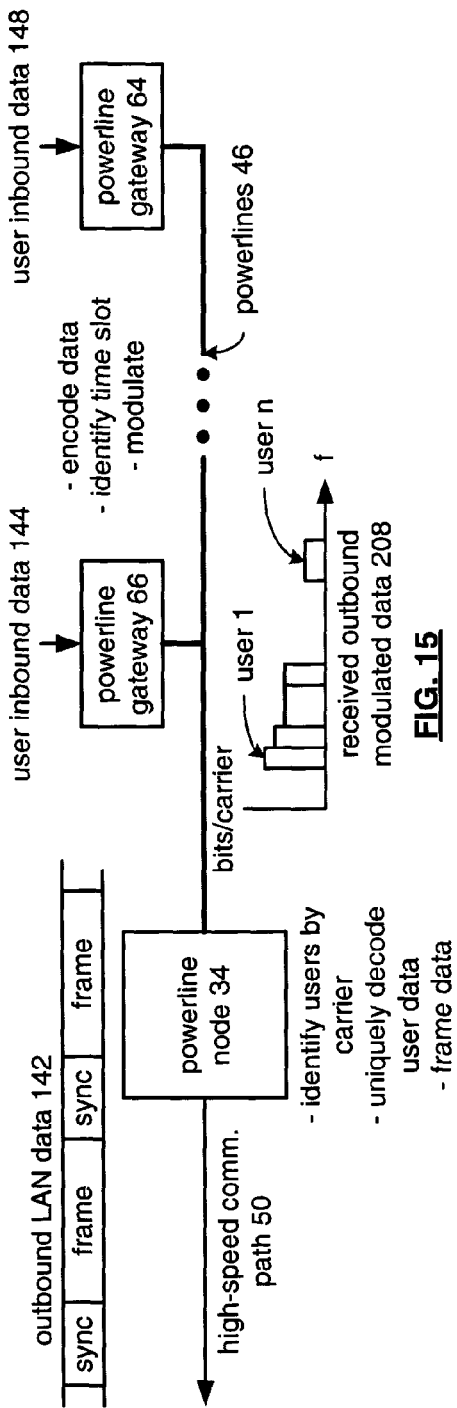

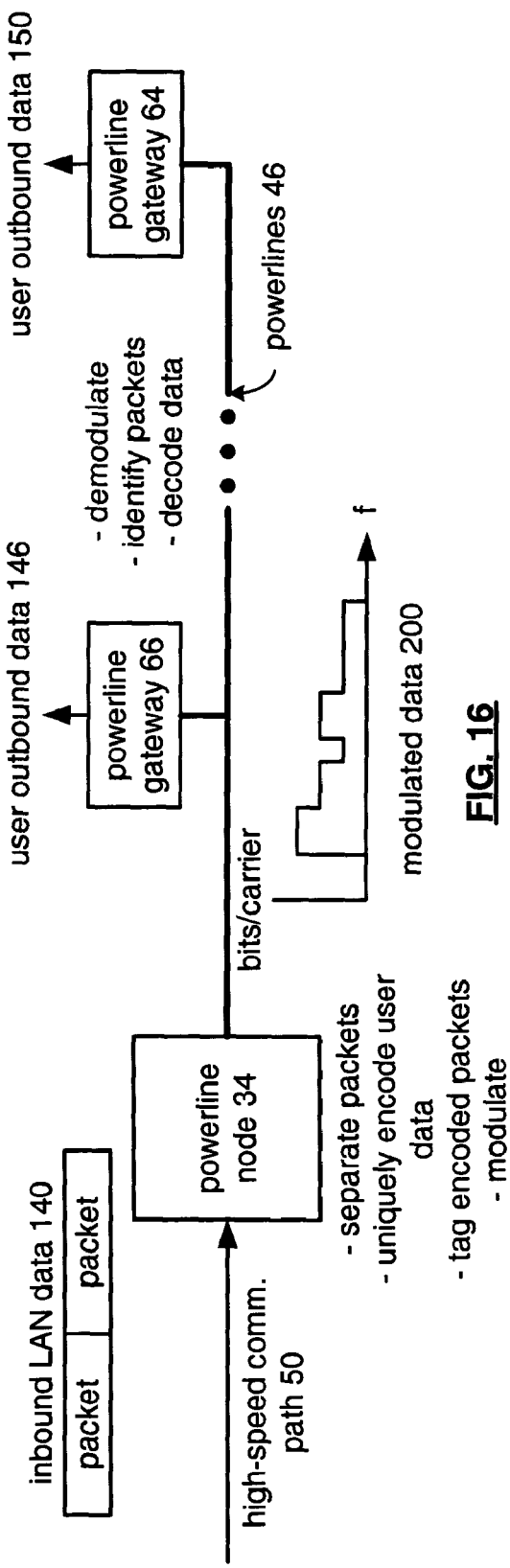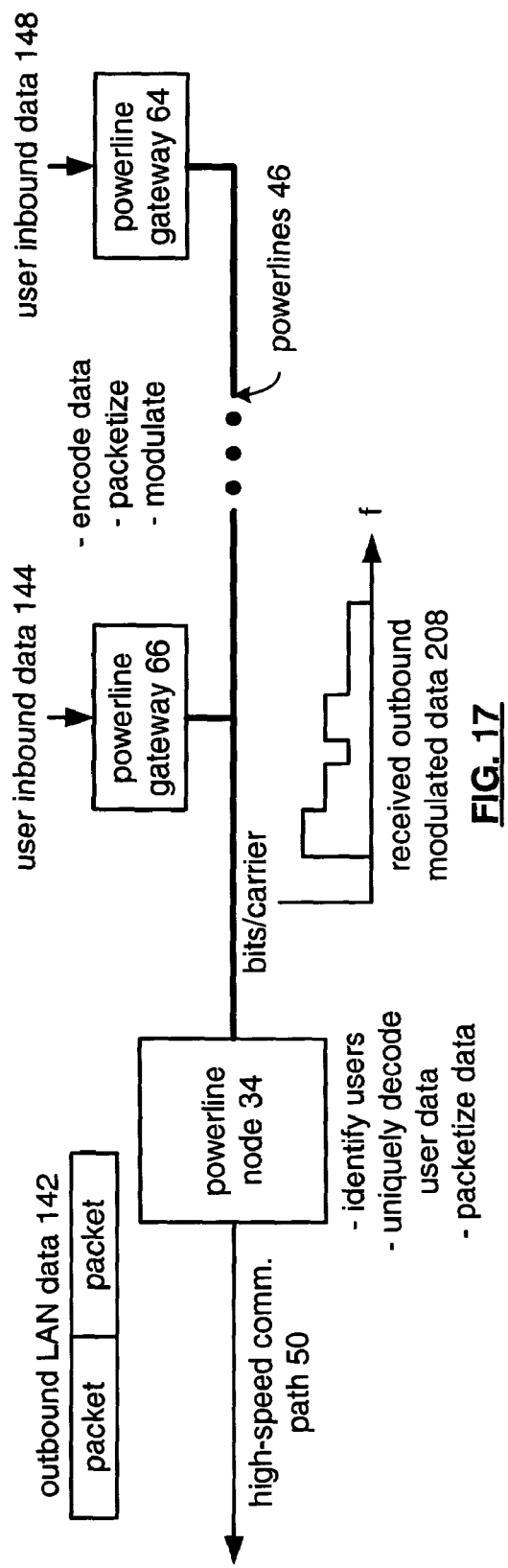

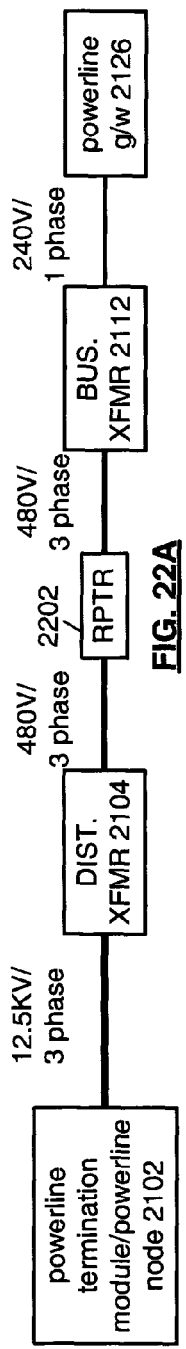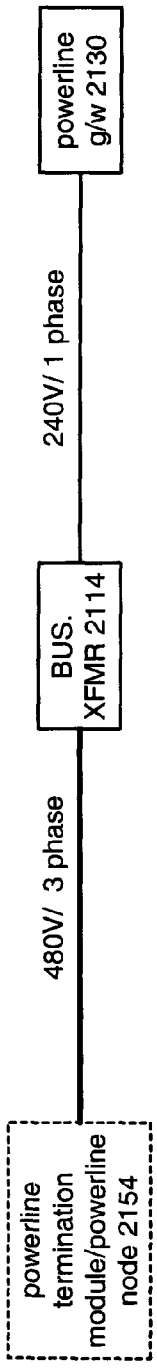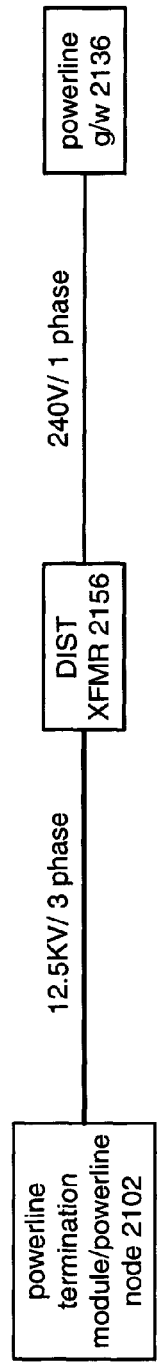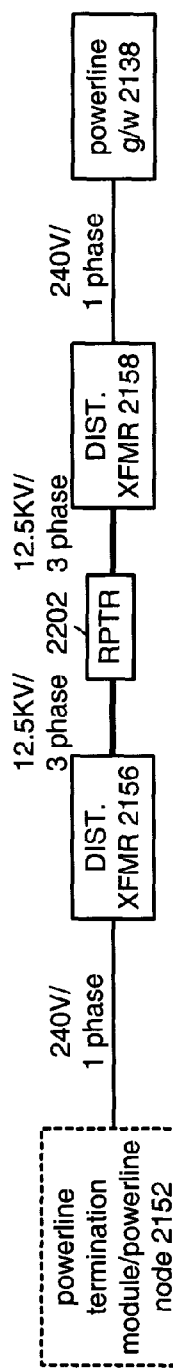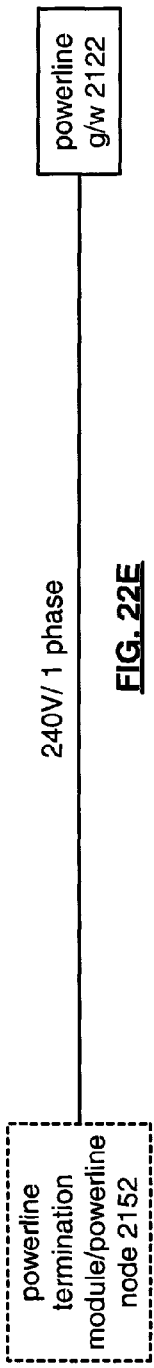

MEDIUM VOLTAGE SIGNAL COUPLING STRUCTURE FOR LAST LEG POWER GRID HIGH-SPEED DATA NETWORK

CROSS REFERENCES TO RELATED APPLICATIONS

This application claims priority to, and is a continuation of, U.S. application Ser. No. 10/661,034, filed Sep. 12, 2003 now U.S. Pat. No. 7,245,472, (1) which claims priority to U.S. Provisional Application No. 60/411,072, filed Sep. 16, 2002; and (2) which also claims priority to, and is a continuation in part of, U.S. application Ser. No. 09/860,260, filed May 18, 2001, now abandoned; U.S. application Ser. No. 09/860,261, filed May 18, 2001, now U.S. Pat. No. 7,194,528; U.S. application Ser. No. 09/860,262, filed May 18, 2001, now U.S. Pat. No. 7,173,938; U.S. application Ser. No. 09/860,263, filed May 18, 2001, now U.S. Pat. No. 6,624,532; U.S. application Ser. No. 10/370,086, filed Feb. 20, 2003, now U.S. Pat. No. 7,142,094; and U.S. application Ser. No. 10/165,451, filed Jun. 7, 2002, now U.S. Pat. No. 7,173,935; and all of the applications identified here are incorporated herein by reference in their entirety for all purposes.

BACKGROUND OF THE INVENTION

1. Technical Field of the Invention

The present invention relates generally to communication systems; and more particularly to high data rate communication systems being partially serviced across a power grid.

2. Related Art

As is known, data may be communicated from one entity (e.g., end user's computer, server, facsimile machine, web browser, et cetera) to another entity via a communication infrastructure. The communication infrastructure may include a public switched telephone network (PSTN), the Internet, wireless communication networks, Local Area Networks (LAN), Wide Area Networks (WAN) and/or any combination thereof. Such communication networks are constantly evolving to provide end users with greater bandwidth such that the user may receive and/or transmit greater amounts of data in shorter times with greater reliability.

In conventional communication systems, an end user is coupled to a communication system, or network, via a wire line or wireless communication path. Wireless communication paths include radio frequency paths and infrared paths, while wire line communication paths include telephone lines, Ethernet connections, fiber optic connections, and/or in-home networks using power outlets. Such in-home networks utilize a home's existing power wiring, which typically carries a 120 VAC or 240 VAC, 60 Hz signal, to carry high frequency signals that represent data. For example, Home-Plug Alliance and other home networking committees are attempting to standardize in-home networking over power lines such that any end user device (e.g., personal computer, laptop, facsimile machine, printer, audio/video receiver, audio equipment, video equipment, et cetera) within the home, when plugged into an electrical outlet, is coupled to the home's power line network. As is known, the in-home networking is utilized once the data reaches the home, which may be done using a 56K modem, DSL modem, cable modem, etc.

As is also known, the last hundred feet of a communication system, i.e., the connection to each individual user, is the most costly and most difficult to install. To make individual user connections, the telephone company, cable company, etc., incurs a truck roll for in-person installation of the wiring, optics, coaxial cable, splitters, specialized modems, etc. In addition, many homes are very difficult to physically access, making the installation of the local connection even more difficult and more costly.

Power, or utility, companies are currently installing, in ground, fiber optic lines in parallel with the installation and/or repair of, power lines into neighborhoods. Such fiber optics may be used for transceiving high-speed data for users within the neighborhoods. The power companies have similar physical constraints in installing fiber optics to each home as the telephone companies and cable companies, in that many homes are physically difficult to access and/or costly to access. Further, the power companies have been unable to easily complete these high-speed data communication paths to the end user's homes.

Therefore, a need exists for a system that enables broadband communications in local area networks of a plurality of homes.

SUMMARY OF THE INVENTION

These needs and others are substantially met by the present invention that, in general, discloses a method and apparatus for power line based communication systems. Such a power line based communication system utilizes the power lines of at least one local distribution transformer, and/or substation transformer, to carry broadband data for a plurality of users that receive power from the at least one local distribution transformer, and/or substation transformer. The power line based communication system includes a powerline termination module, a plurality of powerline gateways, and a plurality of powerline nodes. A local area network (LAN) of the power line based communication system includes a set of power line gates, wherein each of the powerline gateways in a set is associated with a home. The homes of a LAN each receive power from a local distribution transformer. In addition, each LAN includes one of the powerline nodes that is physically co-located with the local distribution transformer, at one of the homes in the LAN, or at any convenient location there between.

Each powerline node of each local area network is operably coupled to the powerline termination module via a high-speed communication path. In general, the powerline termination module manages the broadband data for associated local area networks. Accordingly, the powerline termination module includes routing, networking, and switching functions to facilitate the conveyance of data between users of the local area networks and between users of the local area networks and other entities via a communication network or a plurality of communication networks. The powerline node in a local area network is operably coupled to the powerline gateways within the local area network via the power lines. In addition, the powerline node is operably coupled to the powerline termination module, or switching hub, via a high-speed communication path, such as a fiber optic cable, coaxial cable, telephone line, Ethernet connection, Internet connection, wireless connection, et cetera.

In most embodiments of the power line based communication system, the powerline node couples to a medium voltage power line. Various AC coupling modules facilitate the coupling of the powerline node to the medium voltage power line. Also, various AC coupling modules couple the powerline gateways to the medium voltage power lines.

Other features and advantages of the present invention will become apparent from the following detailed description of the invention made with reference to the accompanying drawings.

BRIEF DESCRIPTION OF THE DRAWINGS

FIG. 14 illustrates a graphical representation of processing inbound local area network data in accordance with the present invention;

FIG. 15 illustrates a graphical representation of processing outbound local area network data in accordance with the present invention;

FIG. 16 illustrates a graphical representation of processing inbound local area network data in accordance with the present invention;

FIG. 17 illustrates an alternate graphical representation of processing outbound local area network data in accordance with the present invention;

FIGS. 22A-22E are block diagrams illustrating various embodiments of the systems of FIGS. 21A and 21B particularly considering the various signal paths provided between transmitter-receiver pairs;

DETAILED DESCRIPTION OF THE FIGURES

Figure 1:
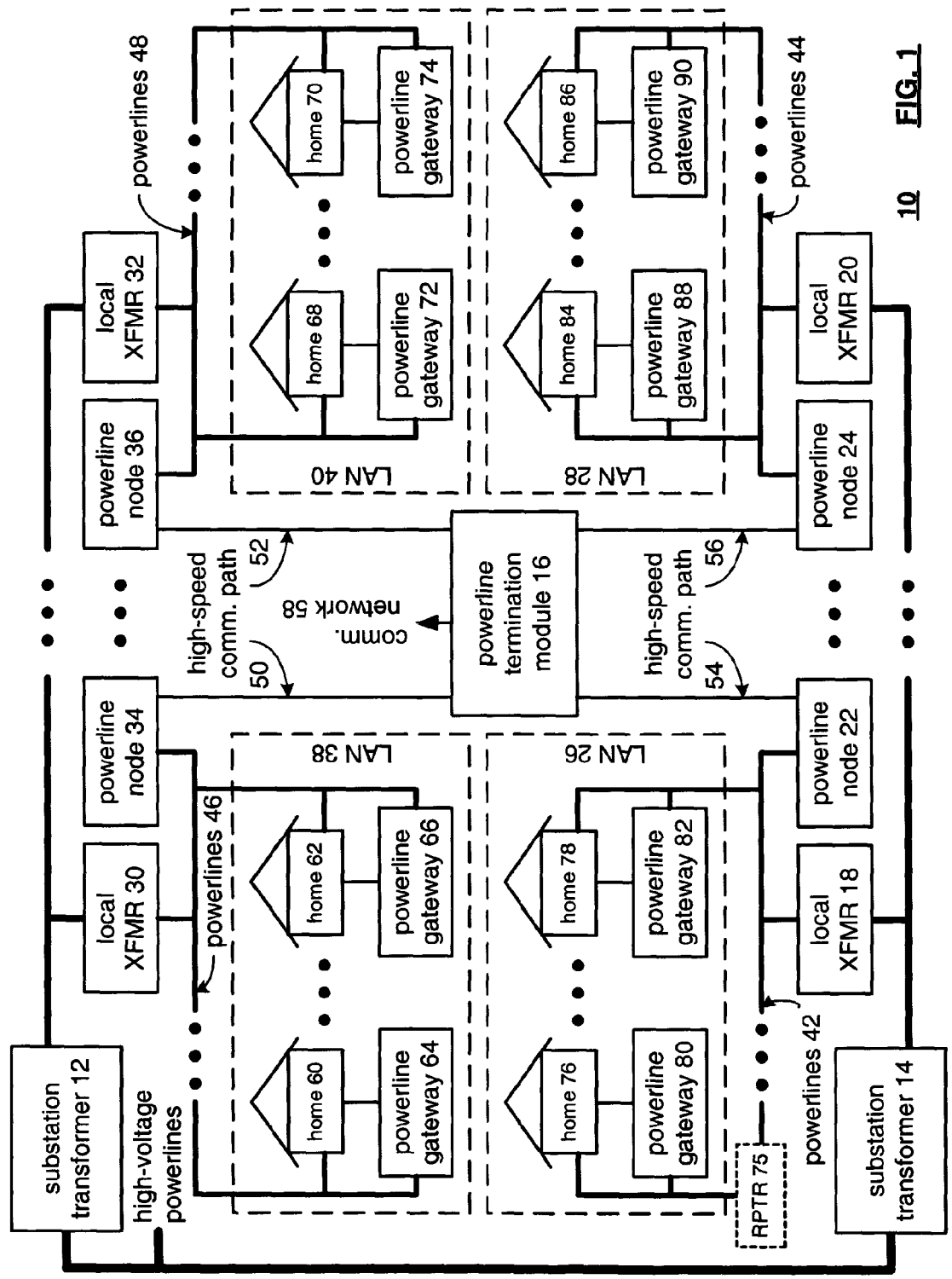
FIG. 1 illustrates a schematic block diagram of a power line based communication system in accordance with the present invention.

FIG. 1 illustrates a schematic block diagram of a power line based communication system 10. The system 10 includes a plurality of substation transformers 12 and 14, a plurality of local transformers 30, 32, 18, and 20, a plurality of powerline nodes 34, 36, 22, and 24, a plurality of local area networks 26, 28, 38, and 40, and a powerline termination module 16. As one of average skill in the art will appreciate, more or less substation transformers, local transformers, powerline nodes, powerline termination modules, and local area networks may be included in a communication system that provides similar communication services as that of the power line base communication system 10. Accordingly, the elements illustrated, and the quantities thereof, are in no way to be construed as to limit the number of elements that may be included in the communication system 10 but are shown to illustrate the concepts of the present invention. The same applies to each figure of the present patent application.

As shown, the substation transformers 12 and 14 are coupled to high voltage power lines. The high voltage power lines provide a 3-phase high voltage signal to each of the substation transformers. The voltage of the high voltage signal may be 69 kilovolts AC (KVAC), 138 KVAC, 345 KVAC, etc. The substation transformers 12 and 14 convert the 3-phase high voltage signal into a lower voltage 3-phase signal. The output voltage of each substation transformer 12 and 14 may be 12.5 KVAC, 13.8 KVAC, or 25 KVAC.

Each of the local distribution transformers 18, 20, 30 and 32 receives the 3 phase 12.5, 13.8 KVAC, or 25 KVAC signal from the respective substation transformer 12 or 14 and produces a single-phase 120 volt AC (VAC) or 240 VAC output. Accordingly, the single-phase 120 VAC or 240 VAC output is provided to a plurality of homes 60-62, 68-70, 76-78, and 84-86 within each local area network 26, 28, 38 and 40 via power lines 46, 48, 42, and 44. Accordingly, each home within a local area network is coupled to each other home in the LAN via power lines of its local transformer. As such, the power lines 42, 44, 46 or 48, carry the single phase 120 VAC or 240 VAC signal to each of the homes to supply the home with its requisite energy needs.

Each local area network 26, 28, 38 and 40 has a powerline node 22, 24, 34 and 36 operably coupled to it. As shown, each powerline node 22, 24, 34 and 36 is operably coupled to the local area network 26, 28, 38 and 40 via power lines 42, 44, 46 and 48 and also to a powerline termination module 16 via a high-speed communication path 50, 52, 54 and 56. As configured, the powerline nodes 22, 24, 34 and 36 provide the last 100 feet, or so, of broadband coupling for the local area networks 26, 28, 38 and 40. As is known, the last 100 feet, or so, of a communication path is one of the most financially significant portion of the communication network. As such, the powerline nodes 22, 24, 34 and 36 in combination with the powerline gateways 64, 66, 72, 74, 80, 82, 88 and 90 provide an economical and reliable communication network for the last 100 feet, or so, of a communication system.

In general, the powerline nodes 22, 24, 34 and 36 transceive data via the high-speed communication paths 50, 52, 54 and 56 with the powerline termination module 16 for their respective local area networks. The powerline termination module 16 is operably coupled to a communication network 58, which may be the Internet, public switched telephone network (PSTN), wireless network, Ethernet network, public wide area network, private wide area network, and/or any other network that routes data amongst a plurality of users as electrical signals and/or as light waves. As such, the powerline termination module 16 acts as a local switch for the powerline nodes 22, 24, 34 and 36 and their respective local area networks.

Each of the powerline nodes 22, 24, 34 and 36 transceives data via the high-speed communication path 50, 52, 54 and 56. The inbound data received by the powerline node 22, 24, 34 or 36 is destined for one or more of the users (i.e., homes, within the respective local area network). The inbound local area network data is processed then and modulated onto the power lines 42, 44, 46 or 48. Each of the powerline gateways 64, 66, 72, 74, 80, 82, 88 and 90 include AC coupling to receive the modulated signal from the power lines. The powerline gateways 64, 66, 72, 74, 80, 82, 88 and 90 demodulate the data, process the data and retrieve the local area data for its respective home, (i.e., user). A user may be a personal computer, printer, facsimile machine, audio equipment, video equipment, in-home network, and/or any device that can receive and/or transmit digital information. Such devices may be utilized within a home 60-62 and coupled to the powerline gateway 64 via an in-home networking system, in-home power line network, a telephone connection, an Ethernet connection, a fiber optic connection, a coaxial cable connection, DSL modem, ISDN modem, 56K modem, and/or any means for coupling one device to another for transmission or reception of electrical and/or light signals.

In addition, each of the powerline gateways 64, 66, 72, 74, 80, 82, 88 and 90 receives data from a user within the respective home, processes the data and modulates it onto the respective power lines. The respective powerline node receives the modulated data, demodulates it, processes it, and places it on the high-speed communication path for transmission to the powerline termination module 16. The powerline termination module 16 then processes the data and routes it either to another user within one of the other local area networks or to the communication network 58.

Figure 2:
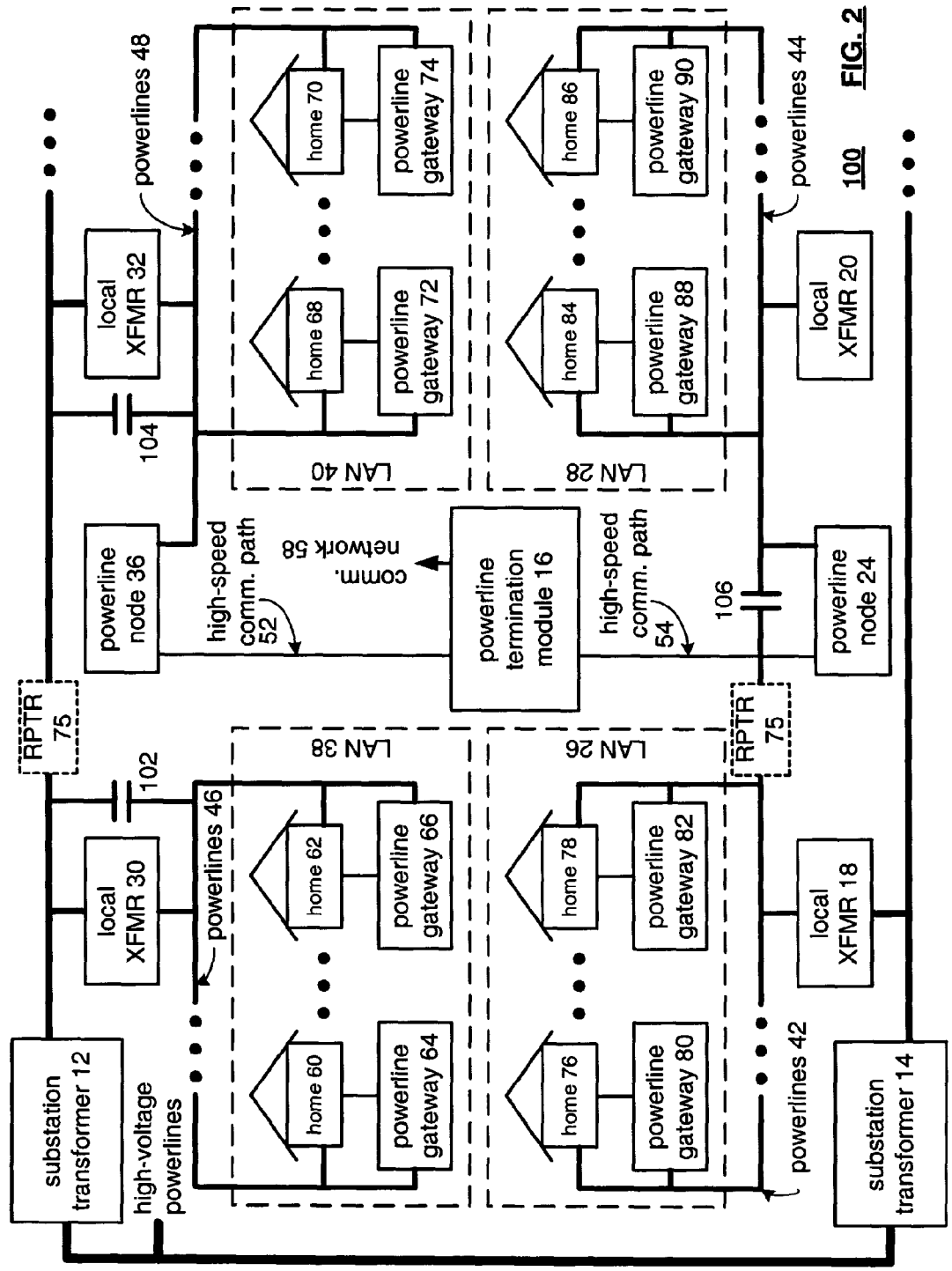
FIG. 2 illustrates a schematic block diagram of an alternate power line based communication system in accordance with the present invention.

FIG. 2 illustrates a schematic block diagram of another power line base communication system 100. In this example of a power line base communication system, the system 100 includes four local area networks 26, 28, 38 and 40, a pair of substation transformers 12 and 14, a plurality of local distribution transformers 18, 20, 30 and 32 and a pair of powerline nodes 24 and 36. Each of the local area networks 26, 28, 38 and 40 include a plurality of homes 76-78, 84-86, 60-62, and 68-70, respectively. Associated with each home in each local area network is a powerline gateway. For instance, powerline gateway 64 is associated with home 60; powerline gateway 66 is associated with home 62, et cetera.

Local distribution transformer 30 is shown to include a high voltage capacitor 102 coupled in parallel with its primary and secondary windings. In addition, local distribution transformer 32 also includes a high voltage capacitor 104 coupled in parallel with its primary and secondary windings. As coupled, the high voltage capacitors 102 and 104 provide a low impedance path for the modulated data produced by the powerline gateways 64, 66, 72 and 74 to the powerline node 36. As such, in this configuration, powerline node 36 may act as the conduit with the powerline termination module 16 for both LAN 39 and LAN 40. As one of average skill in the art will appreciate, the high voltage capacitors 102 and 104 may be a single high voltage capacitor having a capacitance of 100 pF to 10 µF and have a voltage rating in excess of 240 VAC. As one of average skill in the art will also appreciate, the high voltage capacitors 102 and 104 may include multiple capacitors coupled in series and/or in parallel to achieve a desired capacitance and voltage rating. As one of average skill in the art will further appreciate, multiple capacitors may be used to coupled multiple taps, or nodes, of the primary winding to multiple taps, or nodes, of the secondary winding, and are coupled to the same phases of the primary and secondary winding for multiple phase transformers.

Local distribution transformers 18 and 20 have their secondary windings operably coupled together via high voltage capacitor 106. As coupled, the modulated data produced by the powerline gateways within local area networks 26 and 28 are readily coupled to the powerline node 24. As such, powerline node 24 supports both local area networks 26 and 28. In this embodiment, powerline node 24 acts as the conduit to the powerline termination module 16, and hence the communication network, for all users within local area network 26 and 28.

In some installations, the local transformers 32 and 30 will have sufficiently low series impedance in a frequency of interest so that the modulated data will pass through the transformers 30 and 32 substantially or fully unattenuated. In this case, coupling capacitors 102 and 104 are not required.

Modulated data propagating along the power lines over a distance will attenuate and the signal to noise ratio of the modulated data will decrease. Further, Electromagnetic Interference (EMI) will also reduce the signal to noise ratio as the modulated data propagates. Thus, repeaters 75 may be required to boost the signal strength of the modulated data. Whether repeaters 75 will be required, placement of the repeaters 75, and the gain required for the repeaters 75 will typically be unique to each installation. A repeater 75 was shown in FIG. 1 and other repeaters 75 are shown in the subsequent Figures.

As in the embodiment of FIG. 1, the system 100 of FIG. 2 provides the last 100 feet, or so, of a communication network (i.e., the individual coupling to each home within each LAN, or neighborhood) is provided via the powerline nodes 24 and 36, the powerline gateways 64, 66, 72, 74, 80, 82, 88 and 90 and the existing power lines associated with the local distribution transformers.

For the systems shown in FIGS. 1 and 2, the powerline nodes 22, 24, 34 and 36 may be mounted near the local distribution transformers (i.e., on the same pole), incorporated into the local distribution transformer box, mounted at one of the homes within the local area network, or any convenient location between the transformer and the homes of the LAN. As previously mentioned, a local area network may generally be viewed as the homes within a neighborhood wherein each home within the neighborhood is powered by the same local distribution transformer. As such, each LAN network may include 1-500 homes, small businesses, or other structures.

To provide filtering with the local distribution transformers 18, 20, 30, and 32 and/or to prevent unwanted feedback to the substation transformers, each of the local distribution transformers may include a modified fuse to have a desired frequency response. For example, the modified fuse may have a predetermined inductance that provides high-frequency isolation to upstream data and filtering for down-stream data. As a further example, the fuse may include a desired resistance and/or a desired capacitance to provide a more complex frequency response.

Figure 3:
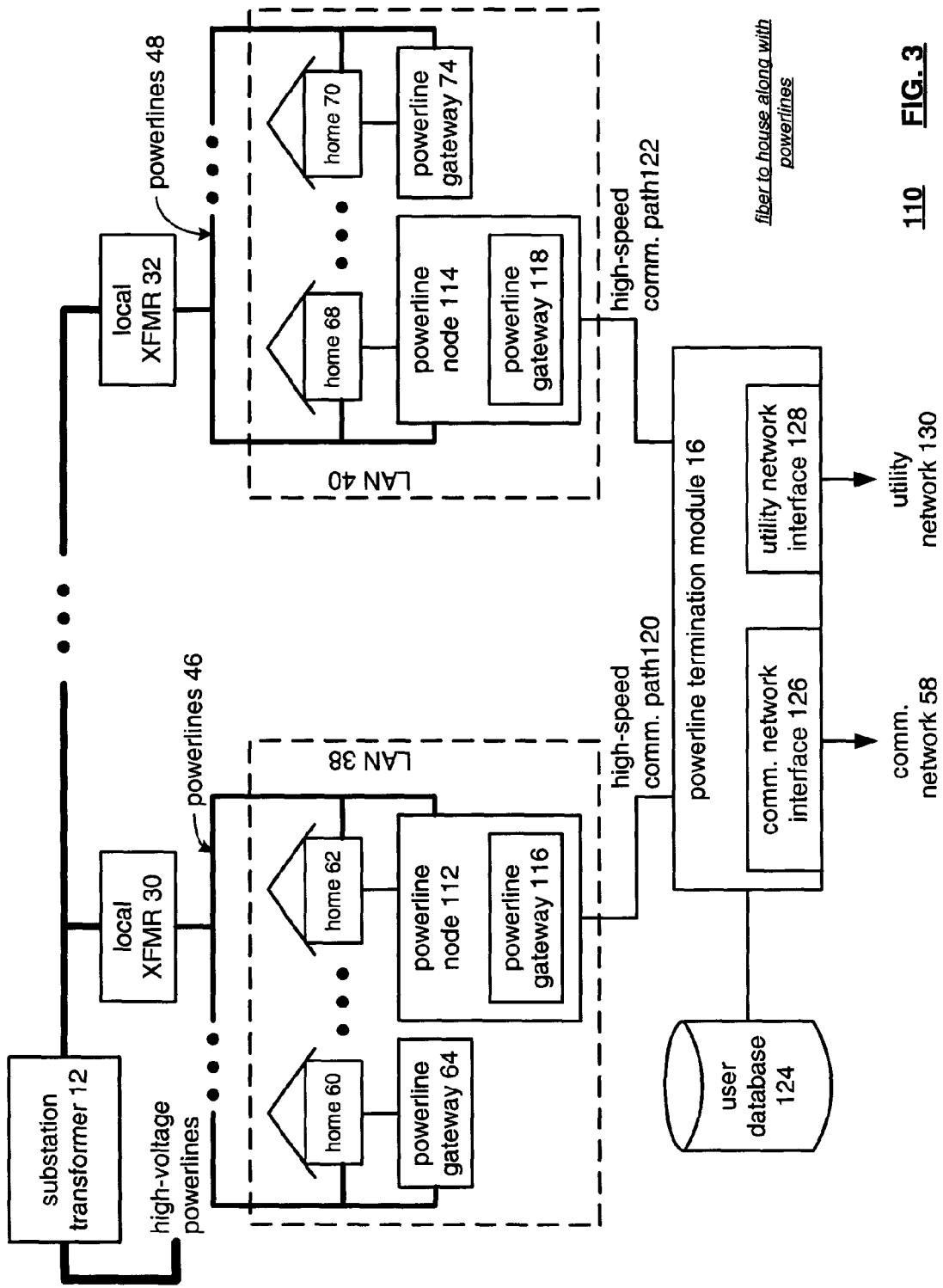
FIG. 3 illustrates a schematic block diagram of another power line based communication system in accordance with the present invention.

FIG. 3 illustrates a schematic block diagram of another power line base communication system 110. The system 110 includes a plurality of substation transformers (only one shown), a plurality of local distribution transformers 30 and 32, and a plurality of local area networks 38 and 40. In this example system, powerline nodes 112 and 114 are associated with an individual home 62 and 68, respectively, within the LAN they support. In addition, each of the powerline nodes 112 and 114 include a powerline gateway 116 and 118 to facilitate transceiving data for the individual home 62 or 68. Each of the powerline nodes 112 are operably coupled to the powerline termination module 116 via a high-speed communication path 120 or 122, which may be a fiber optic cable, coaxial cable, telephone line, wireless communication path, and/or any communication medium that allows 2 devices to transmit analog and/or digital information there between.

The powerline termination module 16 includes a communication network interface 126 and a utility network interface 128. The communication network interface 126 allows the powerline termination module 16 to be operably coupled to a communication network 58. The communication network interface 126 includes the multiplexing and de-multiplexing, switching, routing and/or other interconnections required to interface a plurality of local users with the communication network 58.

The utility network interface 128 provides a similar function but with respect to a utility network 130. Most power companies have their own network to allow communication with substations, local distribution transformers, etc. As such, the utility network 130 may be utilized as at least a portion of the switching fabric to couple multiple local area networks associated with various substations together. This may be done alternatively to or in addition with the coupling to the communication network 58.

The powerline termination module 16 also includes a user database 124, which includes a listing of each user associated with each of the local area networks serviced by the powerline termination module 16. Such information includes, but is not limited to, user identification code, user access code, type of use, type of service, access information, access privileges, et cetera. In general, the powerline termination module 16 provides the platform for system management and controls the high-speed data paths. In one embodiment, the powerline termination module includes a fully redundant architecture that provides fault protection for the control of the system and for the connection to the communication network 58. In addition, the power termination module 16 provides platform interfaces for element management to support up to 2,000 customers, or users. Typically, the powerline termination module 16 will use optical interfaces from 2.4 to 10 gigabits per second to interface with the powerline nodes. Such optical interfacing will utilize a gigabit Ethernet physical layer.

The powerline nodes of FIGS. 1, 2 and 3 generally provide the platform for a conversion of the high-speed electrical of light signals, which may be carried via wires, radio frequencies, and/or fiber optics, from the network into electrical signals that are transmitted over the power line infrastructure to the users of the LANs. The powerline nodes may physically reside at a location that provides the best intersection of the signal to the power network. Such possible locations include at the customer side of the substation transformer, at the customer side of the local distribution transformer, or at a home within the neighborhood serviced by the local distribution transformer. In addition, each of the powerline nodes should be weather proof such that no additional environment protection is needed.

As previously mentioned, each of the substation transformers produces a 3-phase high voltage signal. In accordance with the present invention, each phase produced by the substation transformer may carry separate modulated data for a local area network or a plurality of local area networks. For example, when the services for a particular local area network are relatively low speed, a powerline node may be located at the substation transformer on a one per phase basis (i.e., line to ground) to provide services such as meter reading, turn on-off electrical equipment within the home, burglar alarm activation/deactivation, et cetera. In addition, low speed signaling may be used to test particular power networks to verify bandwidth capabilities. For broadband services, such as Internet access, telephony, et cetera, the powerline node would be located at the low voltage side of a local distribution transformer.

In one embodiment, a powerline node would typically serve in the range of 1-15 homes. In an area where more than 15 homes are supported by a local distribution transformer, a plurality of powerline nodes may be utilized. To provide isolation on the power lines from powerline node to powerline node, and from local area network to local area network, different modulation frequencies may be utilized, the power lines may be frequency division multiplex, time division multiplex, and/or any other mechanism for isolating multiple signals on a single transmission path.

As one of average skill in the art will appreciate, the powerline nodes and powerline gateways may include a battery backup, generator, and/or a fuel cell to power respective portions of the local area network as well as provide in home power when local services have been disrupted.

As one of average skill in the art will further appreciate, a power line base communication system may be configured in accordance with FIGS. 1, 2 and/or 3. For example, one local area network may include a powerline node that is affiliated with a particular home, one local area network may be supported by a powerline node that is physically co-located with the local distribution transformer, while multiple local area networks may be supported by a single powerline node wherein AC coupling provides connectivity between local area networks. In addition, the substation transformer may include the powerline node that provides communication to the entire network affiliated with that particular substation.

Figure 4:
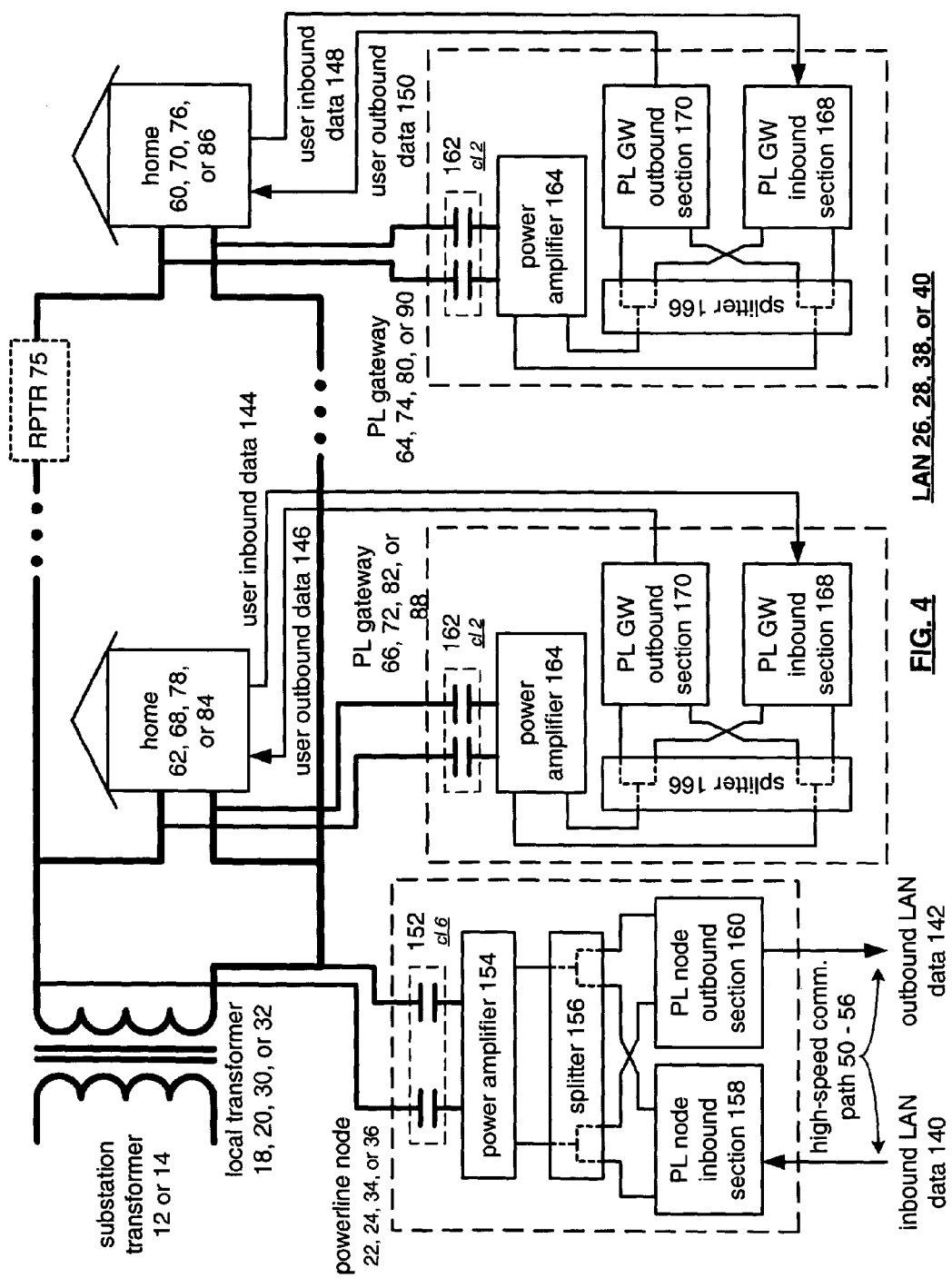
FIG. 4 illustrates a schematic block diagram of a powerline node and powerline gateway in accordance with the present invention.

FIG. 4 illustrates a schematic block diagram of a representative local area network wherein the powerline nodes 22, 24, 34 and 36 are shown in greater detail as well as the powerline gateways 64, 66, 72, 74, 80, 82, 88 and 90. As shown, the powerline node, 22, 24, 34 or 36 includes an AC coupling module 152, a power amplifier 154, a splitter 156, a powerline node inbound section 158 and a powerline node outbound section 160. The inbound and outbound sections 158 and 160 are operably coupled to the high-speed communication path 50 through 56. As coupled, the powerline node 22, 24, 34 or 36 process inbound local area network data 140 and outbound local area network data 142.

In general, inbound section 158 of the powerline node 22, 24, 34 or 36 processes the inbound local area network data 140 based on a desired communication convention. The desired communication convention may be time division multiplexing, frequency division multiplexing, carrier sense multi-access (CSMA), CSMA with collision avoidance, CSMA with collision detection, encryption, buffering, frame relay packetizing, ATM packetizing, internet protocol (IP), and/or any convention for packetizing, framing, and/or encoding data for transmission via a communication network. As such, the inbound local area network data 140 is received via the high-speed communication path 50 through 56 in accordance with a particular communication convention.

Upon receipt, the inbound section 158 deciphers the local area network data 140 to identify the individual addressees, i.e., the individual users within the local area network it supports. The deciphered LAN data 140 is then processed in accordance with the communication convention of the LAN, which may be time division multiplexing, frequency division multiplexing, carrier sense multi-access (CSMA), CSMA with collision avoidance, CSMA with collision detection, encryption, buffering, frame relay packetizing, ATM packetizing, internet protocol (IP), and/or any convention for packetizing, framing, and/or encoding data for transmission via a communication network. The processed data is then modulated in accordance with a modulation protocol of the LAN and provided to splitter 156.

The splitter 156 may be of conventional construct, such as a transformer having a primary and two secondary windings, or a direct access arrangement (DAA), or any device that provides an equivalent function. The power amplifier 154 receives the modulated data via the splitter 156. The power amplifier 154, which may be of a conventional construct as found in DSL modems, ISDN modems, 56K modems, and/or any other type of modem, amplifies the modulated data and, via the AC coupling module 152, places the amplified modulated signals on the power lines.

Each of the powerline gateways, 64, 66, 72, 74, 80, 82, 88 and 90 are operably coupled to the power lines at the respective homes. Each of the powerline gateways includes an AC coupling module 162, a power amplifier 164, a splitter 166, a powerline gateway inbound section 168 and a powerline gateway outbound section 170. The modulated data that has been placed on the power lines by the AC coupling module 152 of the powerline node is received via the AC coupling module 162 of the powerline gateways. The received modulated signals are provided to power amplifier 164, which also may be of a conventional modem construct, amplifies the signals and provides the amplified signals to splitter 166. The splitter 166, which may be of conventional construct, separates the outbound signals, (i.e., the modulated signals received from the powerline node) from the inbound signals (i.e., the received signals from the user that are to be modulated and provided to the powerline node).

As one of average skill in the art will appreciate, for full duplex operation, the inbound data will be modulated at a different frequency than the outbound data. As such, the transmit path (i.e., from the powerline node to the powerline gateways) and receive path (i.e., from the powerline gateways to the powerline node) within the local area network will operate at different frequencies. If half duplex conveyance of data is desired, the same frequency may be used for transmit and receive paths. As such, at certain times, or as indicated by the powerline node, the communication path will be used for data transmission, i.e., from the powerline node to the powerline gateways, or data reception, i.e., from the powerline gateways to the powerline node.

Once the modulated data has been amplified and separated by the splitter 164, the powerline gateway outbound section 170 demodulates the data in accordance with the modulation/demodulation protocol of the LAN. The outbound section 170 then processes the demodulated data in accordance with the LAN communication convention, (e.g., TDM, FDM, CSMA, CSMA with CA, CSMA with CD, decryption, buffering, frame relay packetizing, ATM packetizing, internet protocol (IP), and/or any convention for packetizing, framing, and/or encoding data for transmission via a communication network) to produce retrieved data. The outbound section 170 then provides the retrieved data to the home as user outbound data 146. Each powerline gateway will perform a similar function with respect to modulated inbound data on the power lines.

The coupling of the powerline gateway to the home may be done through a modem, a direction connection, a connection into an in-home network, or any other means for provided data to a user. Once the data is in the home, it may be routed in accordance with whatever in-home networking, or direct connect, convention used therein to a desired end-user.

Each of the users within the homes 60, 62, 68, 70, 76, 78, 84, or 80 also produce user inbound data 144 or 148. The user inbound data 144 or 148 is data generated by a user who desires to transmit it to the communication network to another user via the powerline node. Note that if the user is communicating from home to home within the local area network, the powerline node may facilitate the switching of the data such that the data is not provided on the high-speed communication path 50 or 56. Similarly, if the initiating user and target user are supported by the same powerline termination module, the powerline termination module may provide the appropriate switching, and/or routing, to facilitate the communication.

Once a user has generated the user inbound data 144 or 148, it is processed by the powerline gateway inbound section 168. The powerline gateway inbound section 168 processes the data in accordance with the desired communication convention of the LAN and then modulates the process data in accordance with the modulation protocol of the LAN. The modulated data is provided to splitter 166 and then amplified by power amplifier 164. The amplified signal is placed on the power lines via the AC coupling module 162, which includes one or more high voltage capacitors.

The powerline node receives the user inbound modulated user data via the power lines and the AC coupling module 152, which provides the received signals to the power amplifier 154. The power amplifier 154 amplifies the received inbound modulated user data and provides the amplified data signals to the splitter 156. The splitter 156 separates the user inbound modulated data 144 or 148 from the inbound local area network data 140. The powerline node outbound section 160 receives the modulated user data, demodulates it based on the modulation/demodulation protocol of the LAN to produce demodulated data. The outbound section then processes the demodulated data from the plurality of powerline gateways based on the communication convention (e.g., TDM, FDM, CSMA, CSMA with CA, CSMA with CD, decryption, buffering, frame relay packetizing, ATM packetizing, internet protocol (IP), and/or any convention for packetizing, framing, and/or encoding data for transmission via a communication network) of the high-speed communication path 50-56. Once the data has been processed, the outbound section 160 places the data on the high-speed communication path 50-56 such that the powerline termination module 16 subsequently receives it. Alternatively, the powerline node may be coupled via the high-speed communication path to the communication network, such that the processed data is directly routed to the communication network.

As one of average skill in the art will appreciate, the communication convention used to transceive data via the high-speed communication path 50-56 between the powerline nodes and the communication network and/or the powerline termination module 16, may be a different communication convention from the one used within each of the local area networks. For example, the transmission of user inbound data 144 may utilize a CSMA type process while the data on the high-speed communication path 50-56 may utilize a frame relay communication convention, ATM communication convention, other packetized communication convention, or a frame based communication convention. In addition, each local area network with the power line based communication system may use a different communication convention, however, the communication convention between the powerline nodes and the powerline termination module will be the same. Further, the modulation/demodulation protocol, which may be amplitude modulation, frequency modulation, frequency shift keying, phase shift keying, quadrature amplitude modulation, discrete multi-tone, orthogonal frequency division multiplexing, and code division multiple access, used in each LAN may be the same or varying from LAN to LAN.

Figure 5:
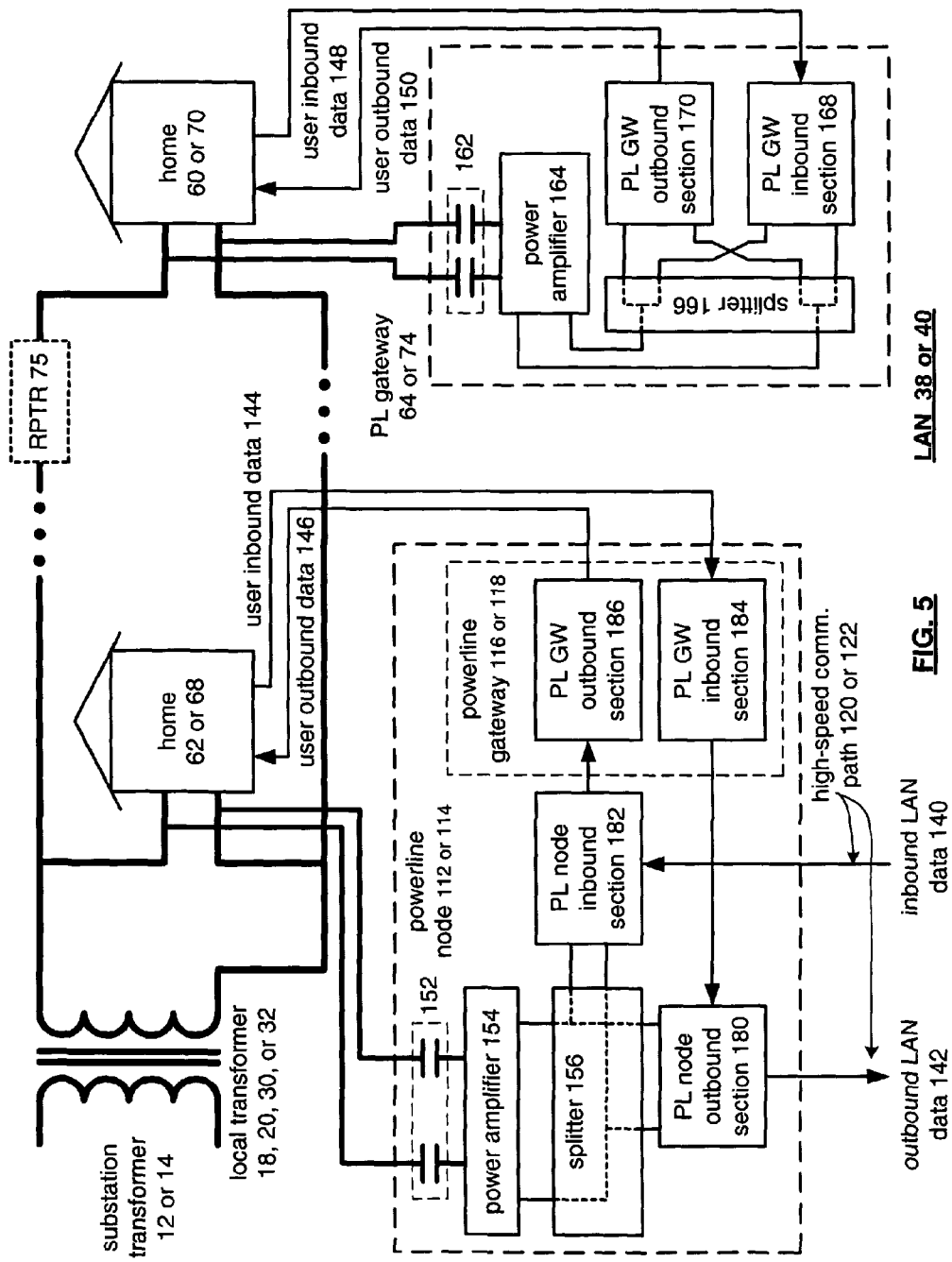
FIG. 5 illustrates a schematic block diagram of an alternate powerline node and powerline gateway in accordance with the present invention.

FIG. 5 illustrates a schematic block diagram of the local area network 38 or 40 of FIG. 3. In this illustration, powerline node 112 includes a powerline gateway 116 or 118 and is associated with home 62 or 68. In addition, the powerline node 112 includes the AC coupling module 152, the power amplifier 154, the splitter 156, a powerline node inbound section 182 and a powerline node outbound section 180. The powerline node inbound section 182 is operably coupled to the high-speed communication path 50-56 to receive inbound local area network data 140. The powerline node inbound section 182 interprets the inbound local area network data 140 to determine whether any of the data is destined for a user within home 62 or 68. If so, the home's data is separated from the remainder of the LAN data and provided to the powerline gateway 116. The powerline gateway outbound section 186 processes the local area data for the user within home 60 or 62 and provides the user outbound data 146 to the home. The remainder of the inbound local area network data 140 is processed by the powerline node inbound section 182 in a similar fashion as the inbound local area network data was processed by powerline node inbound section 158 of FIG. 4.

The user at home 62 or 68 generates user inbound data 144. The powerline gateway inbound section 184 of powerline gateway 116 or 118 receives the user inbound data 144, processes it in accordance with the communication convention and provides it to the powerline node outbound section 180. Alternatively, the powerline gateway inbound section 184 passes the user outbound data 146 directly to the powerline node outbound section 180. The powerline node outbound section 180 processes the received user outbound data 146 with the other data it receives via the power lines, the AC coupling module 152, and the splitter 156. The functionality of the powerline node output section 180 is similar to the functionality of the powerline node output section 160 of FIG. 4.

The powerline gateway 64 or 74 as shown in FIG. 5 functions in a similar way as the powerline gateways discussed with reference to FIG. 4. As such, in this configuration, the powerline node 112 or 114 is mounted to an individual home wherein the high-speed communication path 120 or 122 is provided directly to the home. As such, power companies may provide a single fiber optic line, or other high-speed communication link, to one home within a neighborhood supporting a powerline node as opposed to running such high-speed communication links to each home in the neighborhood. The one high-speed communication link, via the powerline node, supports the data needs of the entire neighborhood. By having one home directly coupled to a high-speed communication path as opposed to many, there is substantial installation cost savings. The cost savings in each neighborhood is achieved by having the powerline node 112 or 114 and a plurality of powerline gateways providing the final 100 feet, or so, of a communication system. In addition, many homes that are physically inaccessible, or physically difficult to reach, can now receive broadband communication services.

Figure 6:
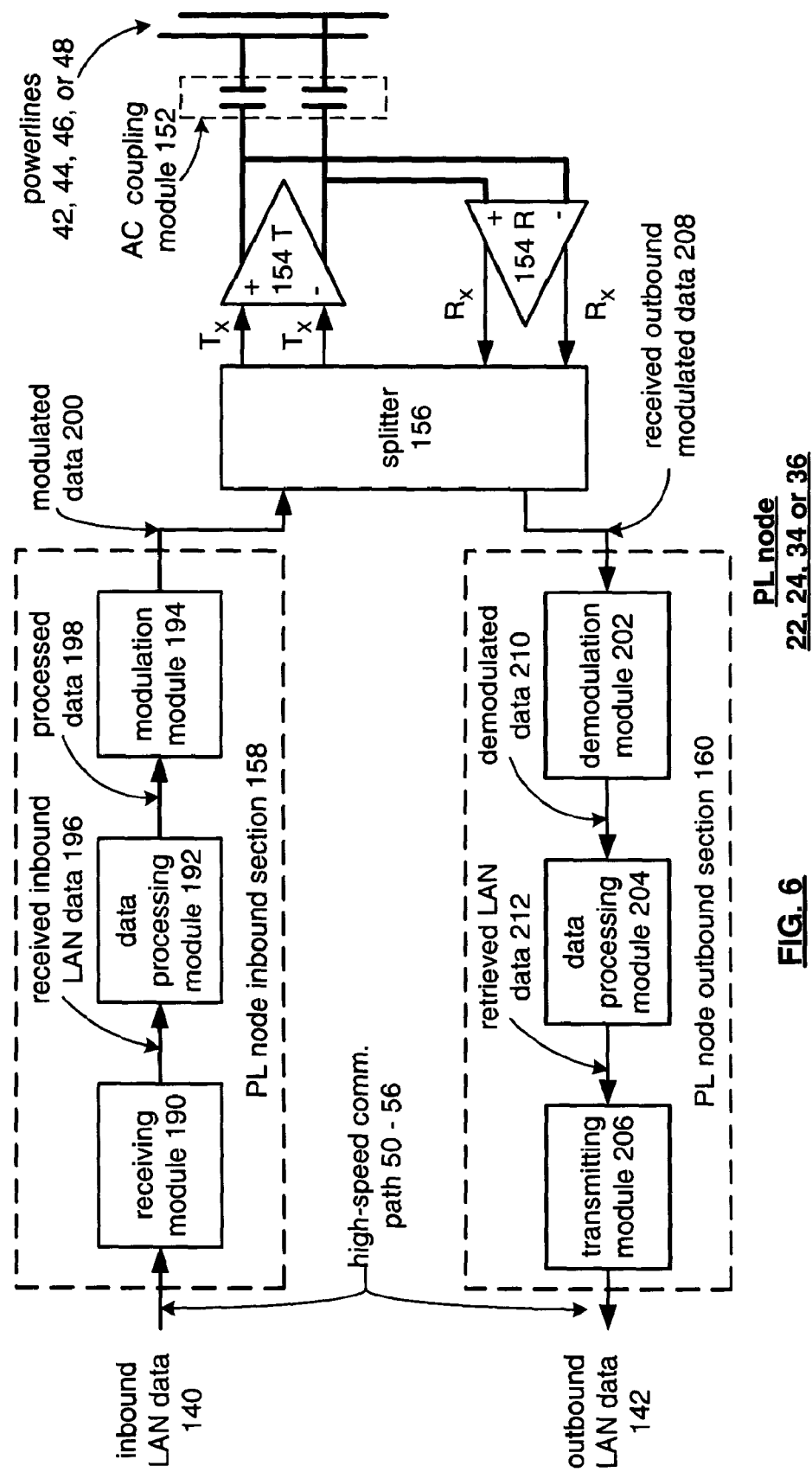
FIG. 6 illustrates a more detailed schematic block diagram of a powerline node in accordance with the present invention.

FIG. 6 illustrates a more detailed schematic block diagram of powerline nodes 22, 24, 34 or 36. As shown, the AC coupling module 152 includes one or more high voltage capacitors, which have a capacitance value depending on the frequency of the modulated data. For example, frequencies in the kilohertz range may require a relatively large capacitor, in the range of 10 to 100 μF (micro Farads), whereas modulated data in the megahertz range would require capacitors in the nF (nano Farad) range. Each of the capacitors should have a sufficient voltage rating to withstand a voltage differential supported by the power lines. For example, if the power lines are supporting 240 volts, the voltage rating of the capacitor should be in excess of 240 volts.

As shown, the high voltage capacitors of the AC coupling module 152 directly couple the power lines 42, 44, 46, and 48, to the differential output of a transmit power amplifier 154T and to the inputs of a receiving power amplifier 154R. The receiving power amplifier 154R provides a differential output to the splitter 156. The splitter 156 also provides a differential input to the transmit power amplifier 154T. The splitter 156 outputs the received differential signal as the received output modulated data 208 to the powerline node outbound section 160.

The powerline node output section 160 includes a demodulation module 202, a data processing module 204, and a transmitting module 206. The demodulation module 202 receives the outbound modulated data 208, demodulates it to produce demodulated data 210. The demodulation module 202 uses a demodulation scheme that is dependent on the modulation scheme used to produce the modulated data 208. For example, the modulation, and hence the corresponding demodulation scheme, may be amplitude modulation, frequency modulation, frequency shift keying, phase shift keying, quadrature amplitude modulation, discrete multi-tone encoding, orthogonal frequency division multiplexing, spread spectrum modulation, and/or any technique for transmitting and/or receiving data using a carrier frequency or plurality of carrier frequencies.

The data processing module 204 receives the demodulated data 210 and processes it in accordance with the desired communication convention to produce retrieved local area network data 212. The communication convention may be time division multiplexing, frequency division multiplexing, CSMA, CSMA with collision avoidance, CSMA with collision detection, decryption, buffering, frame processing, packetized information processing, and/or any other convention for conveying data through a switching fabric between users.

The transmitting module 206 receives the retrieved local area network data 212 and provides it as outbound local area network data 142 on the high-speed communication path. The transmit module 206 may include an electrical interface such as a connector, may include an electrical to an optical interface, may include buffering, and/or any means for transmitting optical and/or electrical signals.

The powerline node inbound section 158 includes a receiving module 190, a data processing module 192, and a modulation module 194. The receiving module 190 is operably coupled to receive inbound local area network data 140 via the high-speed communication path 50-56. The receiving module 190 may include an electrical interface, an optical to an electrical interface, buffering, and/or any means for receiving optical and/or electrical signals. The data processing module 192 receives the inbound local area network data 196 and processes it in accordance with the communication convention to produce process data 198. As mentioned, the communication convention may be in accordance with frame relay processing, time division multiplexing, ATM packetizing data, other packetizing conventions, label switched networks, multiple protocol label switching, CSMA, CSMA with collision avoidance, CSMA with collision detection, encryption, and/or buffering.

The modulation module 194 receives the processed data 198 and produces therefrom modulated data 200. The modulation module 194 modulates the processed data in accordance with the modulation protocol used within the LAN. Such a modulation protocol includes amplitude modulation, frequency modulation, frequency shift keying, phase shift keying, quadrature amplitude modulation, discrete multi-tone modulation, orthogonal frequency division multiplexing, spread spectrum encoding, and/or any other modulation technique for placing a data signal onto a carrier frequency or a plurality of carrier frequencies.

The splitter 156 receives the modulated data 200 and provides it to the transmit power amplifier 154T. The power amplifier 154T produces a differential output that is provided to the AC coupling module 152. The amplified modulated data 200 is then placed on power lines 42, 44, 46 or 48, which may be received by one or more of the powerline gateways coupled to the respective power lines.

Figure 7:
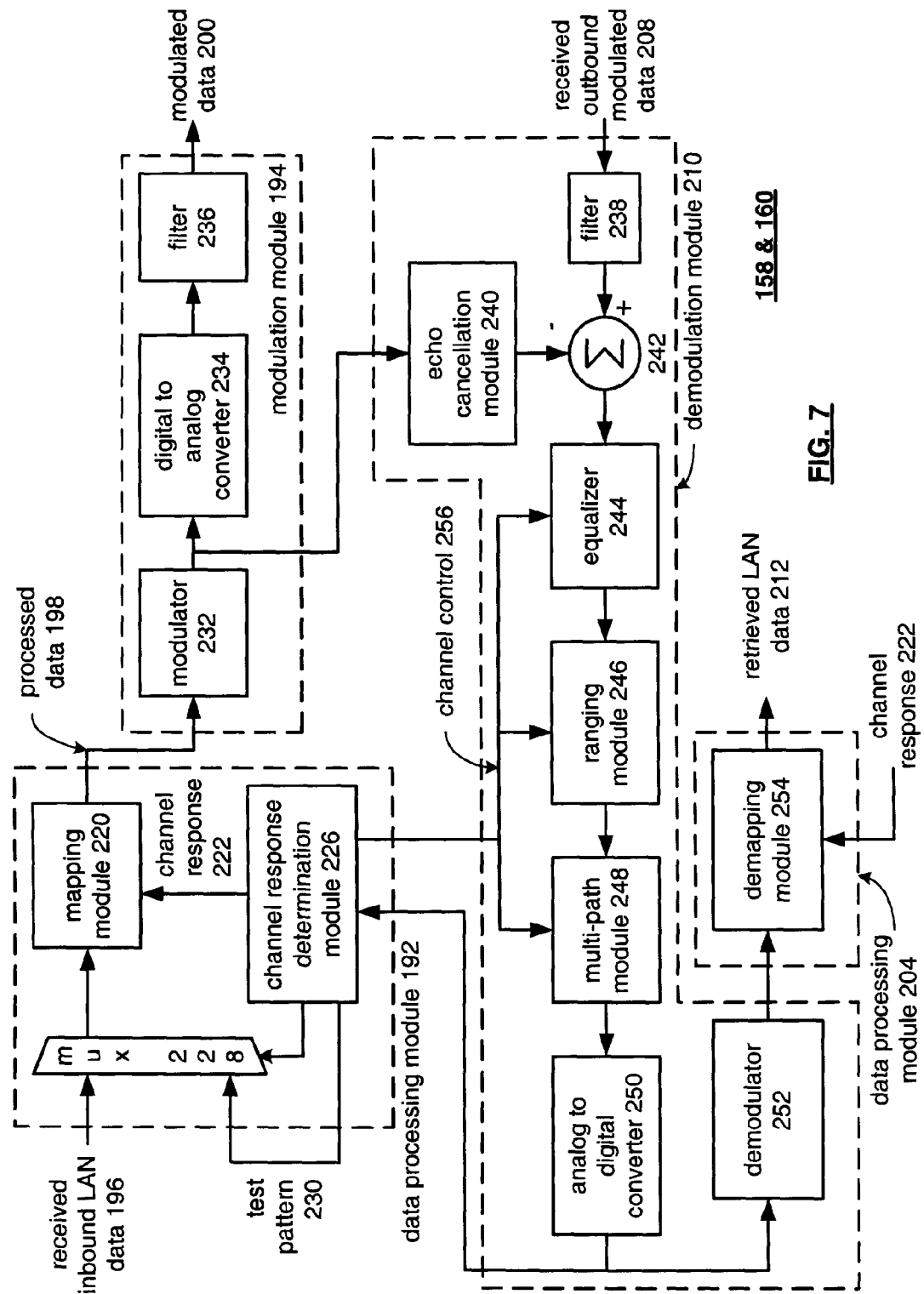
FIG. 7 illustrates a detailed schematic block diagram of a portion of the powerline node of FIG. 6.

FIG. 7 illustrates a more detailed schematic block diagram of an embodiment of the powerline node inbound section 158 and powerline node outbound section 160 of FIG. 6. As shown, the data processing module 192 of the inbound section 158 includes a multiplexor 228, a channel response determination module 226 and a mapping module 220. The multiplexor 228 is controlled by the channel response determination module 226 to output either received inbound local area network data 196 or test pattern data 230. In normal operation, the multiplexor 228 will output the received inbound local area network data 196. In test mode and/or set-up mode, the channel response determination module 226 produces test patterns 230 (i.e., known signals), which are outputted by multiplexor 228. The test patterns are generated to enable the channel response determination module 226 to determine the frequency characteristics of the power lines within the local area network.

The mapping module 220 receives the inbound LAN data 196 or the test pattern 230 and maps the data into frequency bins based on the channel response 222 of the power lines. The mapped, or processed, data 198 is then provided to the modulation module 194. The functionality of the data processing module 192 will be described in greater detail with reference to FIGS. 8 and 9.

The modulation module 194 includes a modulator 232, a digital to analog converter 234, and a filter 236. The modulator 232 modulates the processed data 198 in accordance with the modulation protocol incorporated by the local area network. The modulated data is then converted to an analog signal via the digital to analog converter 234. The analog signal is then filtered via filter 236 and provided as modulated data 200. The output of modulator 232 is also provided to an echo cancellation module 240 of the demodulation module 210.

The demodulation module 210 includes a filter 238, a summing module 242, the echo cancellation module 240, an equalizer 244, a ranging module 246, a multipath module 248, an analog to digital converter 250, and a demodulator 252. The data processing module 204 includes a demapping module 254. The demodulation module 210 may further include an error correction module that provides CRC verification, forward error correction, and/or any other type of conventional error correction to compensate for impulse noise, line variations, etc.

The filter 238 is operably coupled to filter the outbound modulated data 208. The summing module 242 subtracts the modulated data 200 via the echo cancellation module 240 from the filtered outbound modulated data 208. As one of average skill in the art will appreciate, the magnitude of the modulated data 200 will in many cases be substantially greater than the magnitude of the outbound modulated data 208. Thus, echo cancellation is required to accurately interpret the outbound modulated data 208.

The equalizer 244 is operably coupled to receive the output of summing module 242 and is programmed by the channel response determination module 226 via a channel control signal 256 to equalize the magnitude of the signals in the frequency bins across the frequency of interest. As one of average skill in the art will appreciate, carrier frequencies having lower frequencies typically have a greater magnitude when transmitted over a distance than carrier frequencies having higher frequencies. In addition, environmental conditions cause variations in the performance of the power lines such that such frequency bins may have varying amplitudes. Accordingly, the equalizer 244 is programmed based on the channel response determination module to equalize the energies within the frequency bins across the frequencies of interest. The channel response determination module 226 determines the channel control signal 256 for the equalizer based on the processing of the test patterns 230 when received via the demodulation module 210.

The ranging module 246 is programmed via the channel response determination module 226 via the channel control signal 256 to account for impedance variations of the loading on the power line.

The multipath module 248 is operably coupled to receive the output of the ranging module 246 to provide for compensation for multipath errors on the power lines. The level of error correction is based on a channel control signal 256 as determined by the channel response determination module 226. As one of average skill in the art will appreciate, the demodulation module 210 may include one or more of the equalizer, ranging module 246 and multipath module 248. If the demodulation module 210 includes each of these elements, the control channel signal 256 will include separate signaling for each of these modules such that each module may be separately programmed. The correction for multipath error, ranging, and equalization of signals is known, thus no further discussion will be presented except to facilitate the understanding of the present invention. As one of average skill in the art will further appreciate, the power lines may be pre-tested (i.e., prior to the installation of the powerline node and associated powerline gateways), using a device that includes the channel response module 226, the equalizer 244, the ranging module 246, and/or the multi-path module 248. By pre-testing the response of the power lines, the elements of the powerline node and powerline gateways may be tuned to provide more reliable initial operation.

The analog to digital converter 250 receives the output of the multipath module 248 and produces a digital representation thereof. The digital representation is provided to the channel response determination module 226 and to demodulator 252. The demodulator 252 demodulates the digital signal based on a demodulation protocol, which corresponds to the modulation protocol utilized to produce the modulated data 200, to retrieve the data. The demodulated data is provided to the demapping module 254, which, based on the channel response 222, produces the retrieved local area network data 212.

Figure 8:
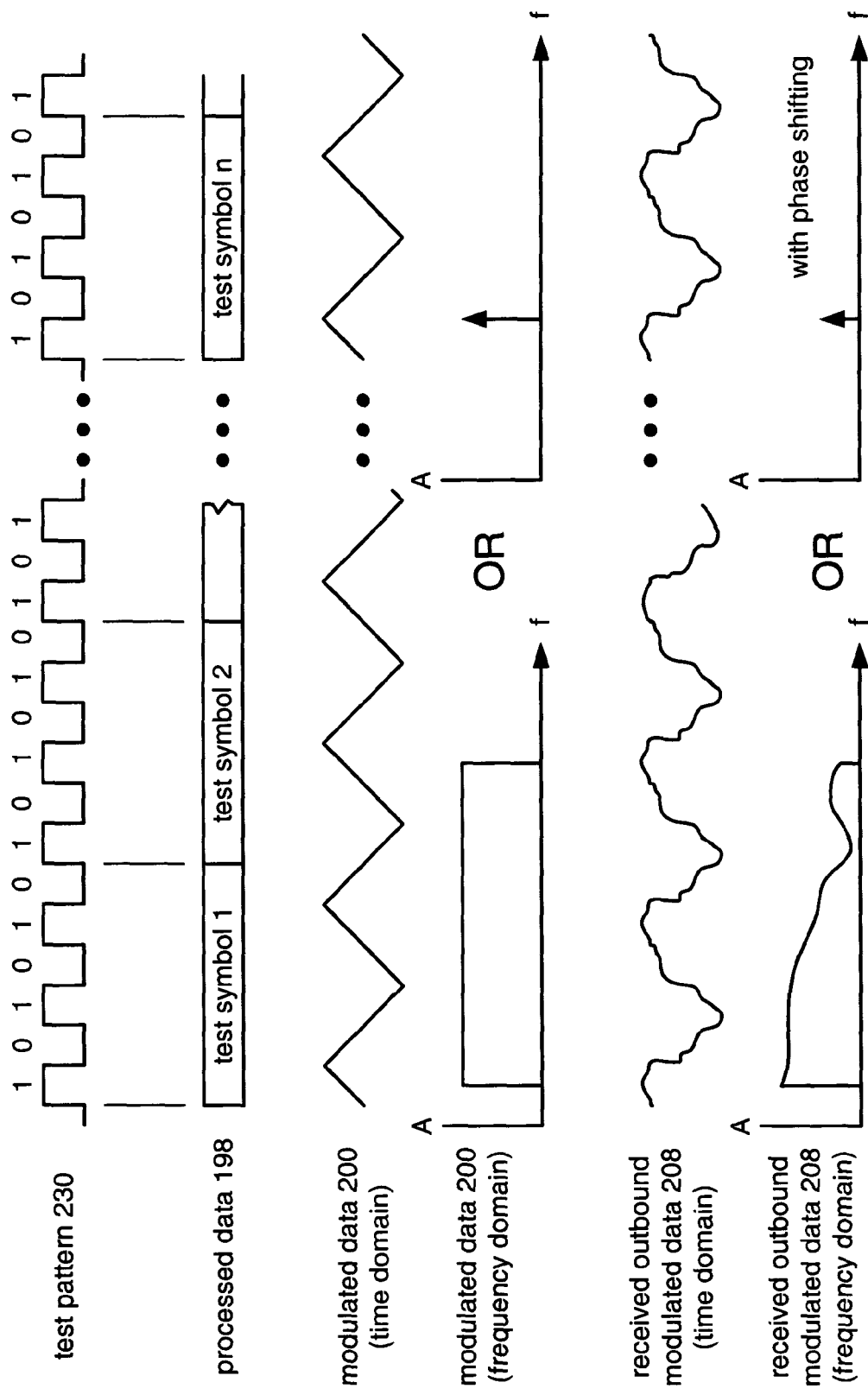
FIGS. 8 and 9 illustrate a graphical representation of the general operation of the powerline node in accordance with the present invention.
Figure 9:
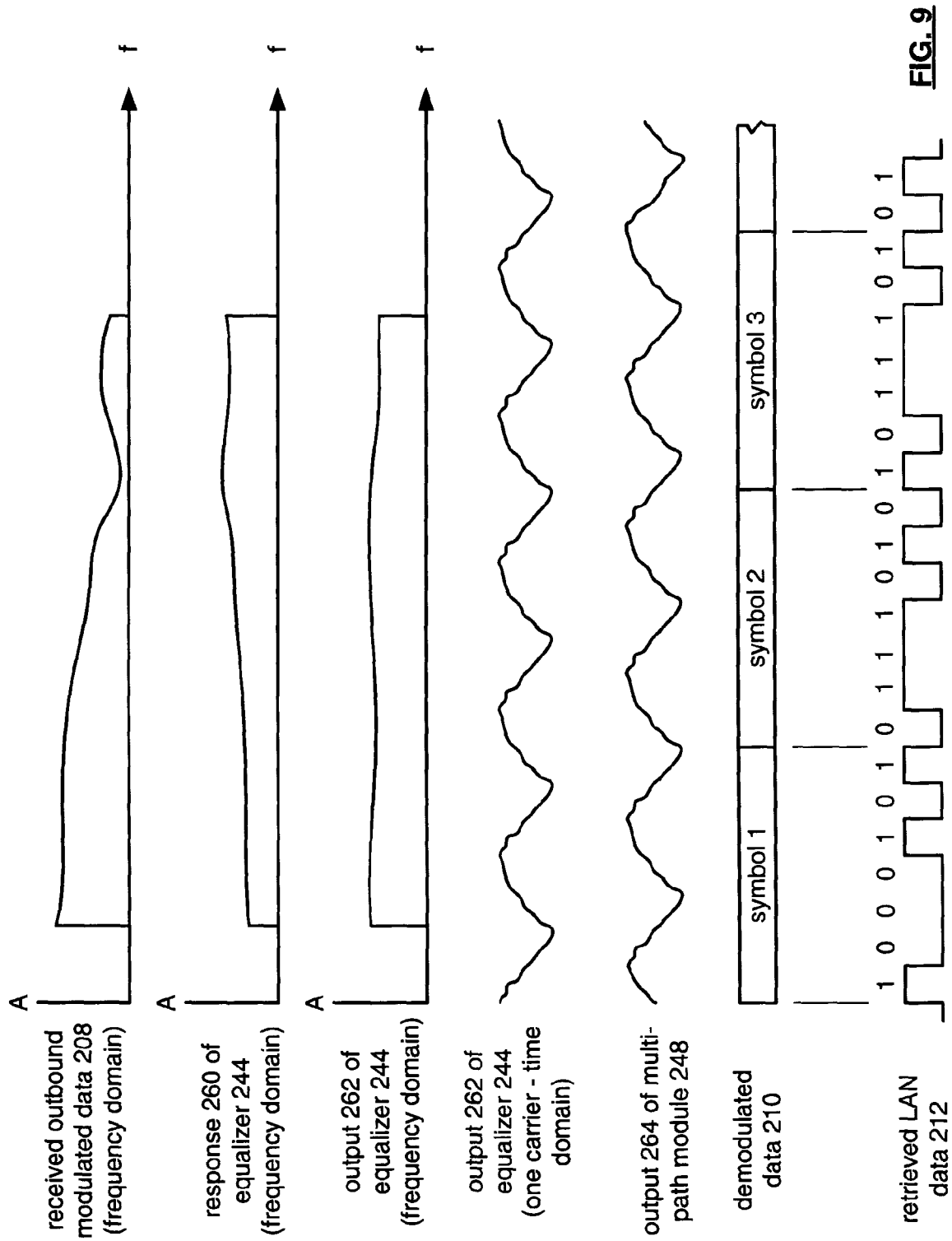

FIGS. 8 and 9 illustrate a graphical representation of the operation of the circuit of FIG. 7. As shown in FIG. 8, a test pattern 230 is generated to include a series of bits, which may be representative of a pulse tone similar to the training sequences used in DSL modem-central office interaction. The mapping module 220, based on the channel response 222, produces processed data 198. In essence, the mapping module 220 maps the data of the test pattern 230 into test symbols identified by test symbol 1, test symbol 2, through test symbol n. The test symbols may be formatted in accordance with frame relay transmissions, packetized transmissions, and/or label switching packets.

The processed data 198 is modulated into an analog signal via the modulation module 194. The modulated data 200 is shown in the time domain for a single carrier frequency. If the modulation scheme utilizes a plurality of frequency bins, each frequency bin would have its own analog signal having a unique frequency. This is shown as the time domain representation of the modulated data 200. The modulated data 200 is also shown in the frequency domain. The $1^{st}$ representation of the frequency domain illustrates the modulated data 200 spanning a multitude of frequencies (e.g., 1 MHz to 10 MHz). The range of frequencies includes a plurality of frequency bins for transporting the processed data 198 once modulated. Conversely, if the modulation scheme incorporates a single carrier frequency, the frequency domain representation of the modulated data 200 is shown in the right portion of the figure. As one of average skill in the art will appreciate, if the mapping module processes the received inbound local area network data 196, the processed data 198 will include symbols representing the inbound local area network data 196 as opposed to the test symbols representing the test pattern 230. The representation of the modulated data in the time and frequency domain will be similar.

In the test mode, the plurality of powerline gateways may echo back the test patterns received from the powerline node, or may generate their own test patterns to transmit to the powerline node. In either situation, the demodulation module 210 receives the outbound modulated data 208. The outbound modulated data 208 is shown in both the time and frequency domains. As shown in the time domain, the triangular waveform of the modulated data 200 has been distorted into a triangle-like shape signal due to distortion caused by the characteristics of the power line. The frequency domain representation of the modulated data 208 has the amplitude, or available bits per carrier frequency, vary with respect to the frequency. If the modulation, and corresponding demodulation technique utilizes a single carrier frequency, the frequency domain representation of the output modulated data 208 would appear on the right and have some corresponding phase shifting.

The channel response determination module 226 receives the outbound modulated data 208 via the analog to digital converter. Based on the difference between the modulated data 200 and the received outbound modulated data 208 during the test condition, the channel response determination module 206 generates the channel control signal 256 for the equalizer 244, the ranging module 246 and/or the multipath module 248. In addition, the channel response determination module 226, based on the frequency domain of the output modulated data, generates the channel response information 222 that is used by the mapping module 220. For instance, as shown in FIG. 8 with respect to the frequency domain representation of the outbound modulated data 208, the amplitude of the signal drops dramatically as the frequency increases such that the bit capacity with bins in that frequency range may be unusable. As such, the channel response information provided to mapping module 220 would indicate that the bins in this frequency range would not carry data or would carry a minimal amount of data.

FIG. 9 illustrates a portion of the demodulation module 210 after the equalizer 244, ranging module 246, and multipath module 248 have been programmed via the channel response determination module 226. As shown at the top of FIG. 9, the received outbound modulated data in the frequency domain is represented. Based on this information, the channel response determination module 226 determines the response 260 of the equalizer 244. This is shown in the frequency domain. By applying the response 260 of equalizer 244 to the received outbound modulated data 208, the output 262 of equalizer 244, in the frequency domain, is more linear. This is represented as the output 262 of equalizer 244. If the modulation and corresponding demodulation scheme utilizes a single carrier frequency, the output 262 of equalizer 244 is shown in the time domain. In this example, the output of equalizer 262 is more representative of a triangular waveform, which corresponds to the modulated data 200. Note that the ranging module 246 adjusts the reflected impedance of the demodulation module 210 based on the impedance of the power line.

The multipath module 248 corrects for multipath error, which distorts the signal. As such, the multipath modulator 248 corrects for phase shifting irregularities and distortion due to multipath error. The single carrier time domain representation of the output of multipath module 248 is shown as output 264. The analog signals, or signals of the modulated data 208, after being processed by the equalizer 244, the ranging module 246 and/or the multipath module 248, are converted into a digital signal via the analog to digital converter 250. The demodulator 252 demodulates the digital signals to produce the demodulated data 210. The demodulated data is represented by symbols 1, 2, 3, et cetera. The demapping module 254 receives the demodulated data 210 represented by symbols to produce the retrieved local area network data 212.

Figure 10:
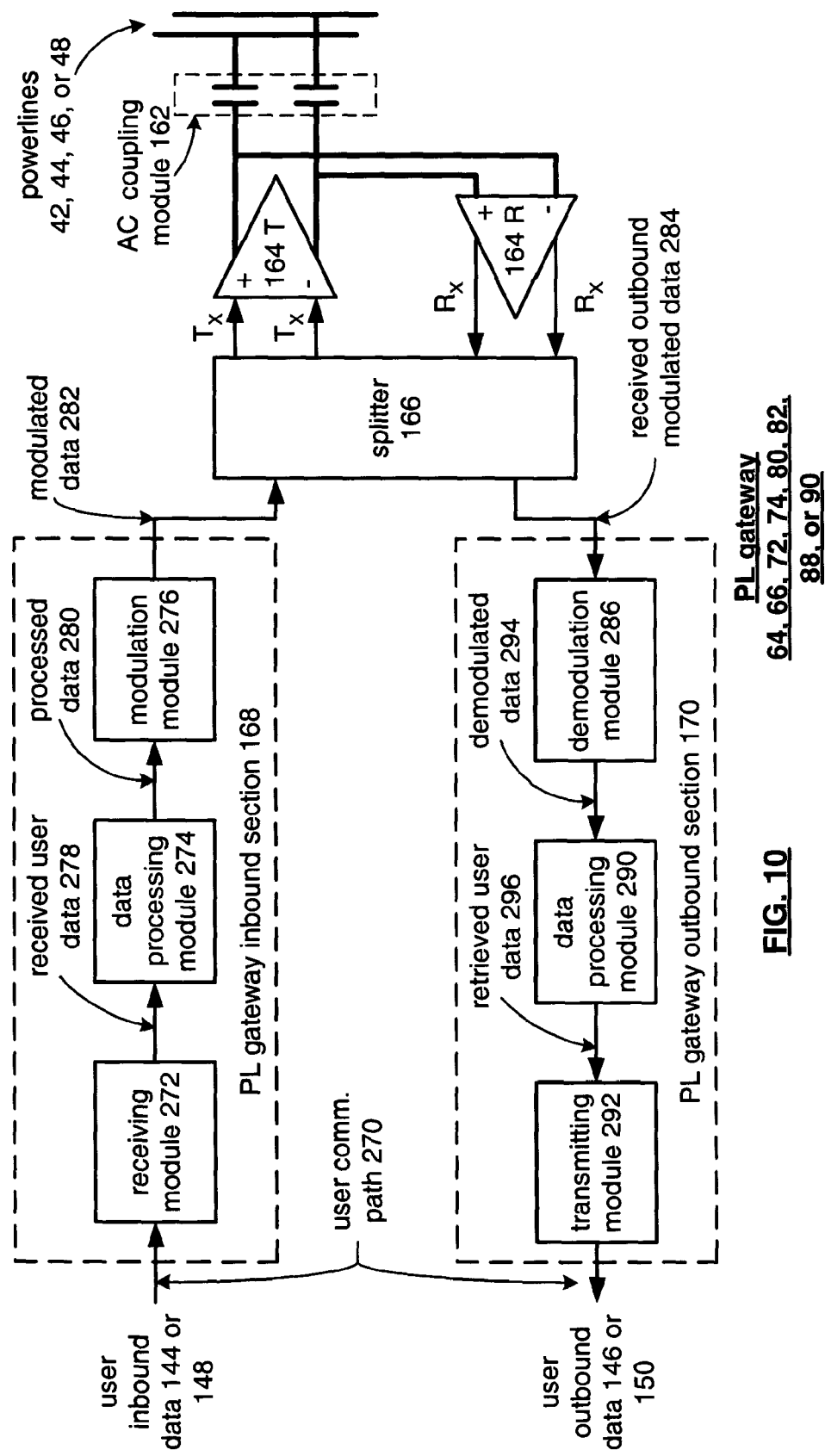
FIG. 10 illustrates a schematic block diagram of a powerline gateway in accordance with the present invention.

FIG. 10 illustrates a graphical representation of the powerline gateways 64, 66, 72, 74, 80, 82, 88 or 90. The gateway includes a powerline gateway inbound section 168, a powerline gateway outbound section 170, a splitter 166, Tx and Rx power amplifiers 164T and 164R, and an AC coupling module 162. The powerline gateway inbound section 168 includes a receiving module 272, a data processing module 274, and a modulation module 276. The receiving module 272, which may be an electrical interface, an optical to electrical interface, and/or a buffer, receives the user inbound data 144 or 148 via a user communication path 270. The user communication path may be an in-home system, phone lines, Ethernet connection, direct connect, wireless connection, and/or any mechanism within a home to couple data to a device outside of the home.

The data processing module 274 receives the inbound user data 278 and processes it in accordance with the desired communication convention to produce the processed data 280. The desired communication convention corresponds with the convention utilized within the local area network such as frame relay, ATM packets, packetizing data, time division multiplexing, frequency division multiplexing, CSMA, CSMA with collision avoidance, CSMA with collision detection, encryption, and/or buffering.

The modulation module 276 receives the processed data 280 and produces therefrom modulated data 282. The modulation module 276 utilizes a modulation protocol to produce the modulation data. The modulation protocol is as previously discussed which may be, but is not limited to, amplitude modulation, frequency modulation, frequency shift keying, phase shift keying, quadrature amplitude modulation, discrete multi-tone modulation, orthogonal frequency division multiplexing, spread spectrum encoding, and/or any other technique for modulating data on a carrier frequency or a plurality of carrier frequencies.

The splitter 166 receives the modulated data 282 and provides it to the transmit power amplifying 164T. The power amplifier 164T produces a differential output that is provided to the AC coupling module 162. The AC coupling module 162 includes one or more high voltage capacitors that provide AC coupling of the output of the power amplifier 164T to power lines 42, 44, 46 or 48.

In addition, the AC coupling module 162 provides AC coupling of modulated data on power lines 42, 44, 46 and 48 to the inputs of the receive power amplifier 164R. The differential output of received power amplifier 164R is provided to splitter 166. The splitter 166 provides the received outbound modulated data 284 to the powerline gateway outbound section 170.

The powerline gateway outbound section 170 includes a demodulation module 286, a data processing module 290, and a transmitting module 292. The demodulation module 286 receives the received outbound modulated data 284 and demodulates it based on the modulation/demodulation protocol. The data processing module 290 receives the demodulated data 294 and processes it in accordance with the desired communication convention to produce retrieved user data 296. The transmitting module 292 provides the retrieved user data 296 as user outbound data 146 or 150 to the user via the user communication path 270.

Figure 11:
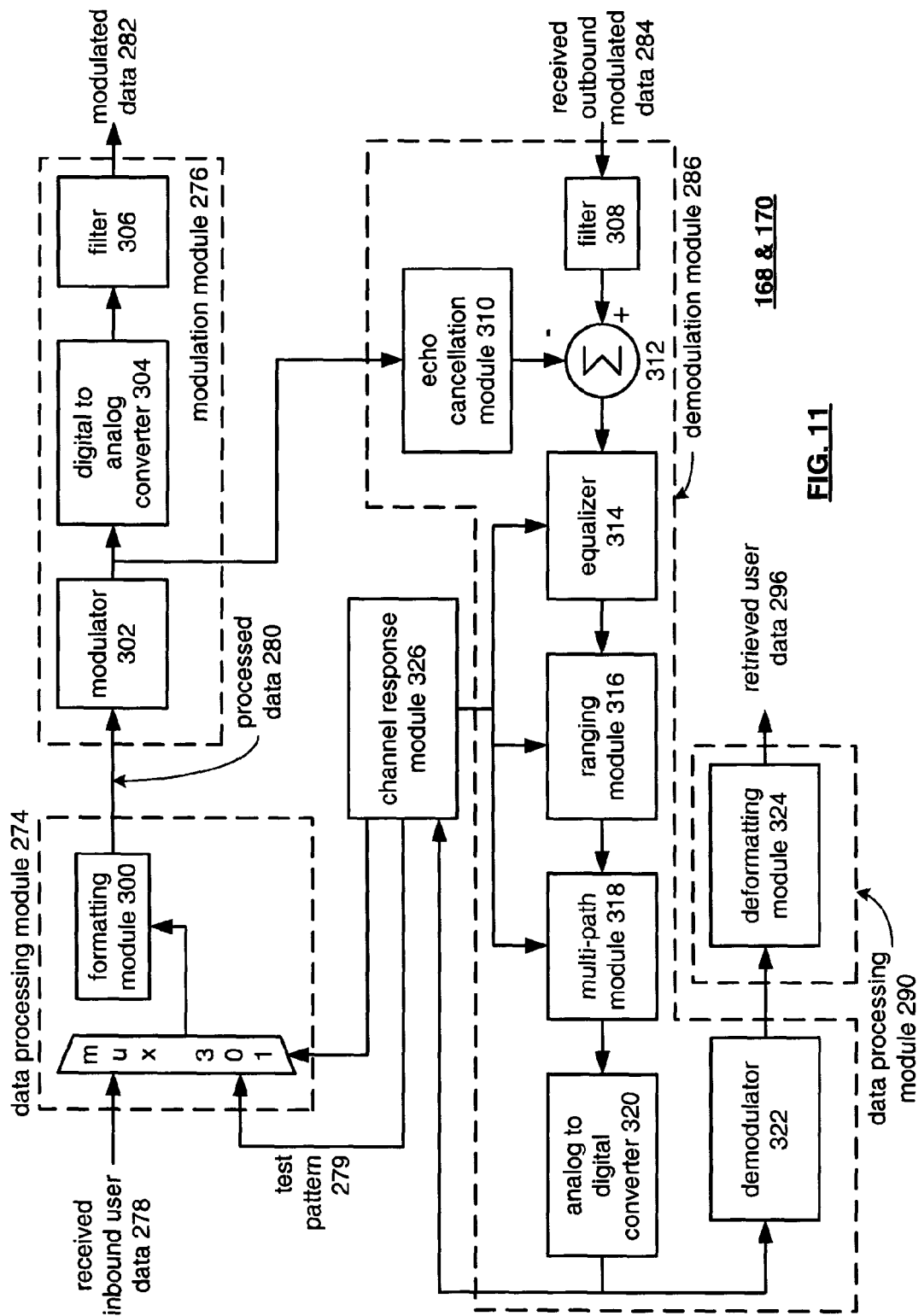
FIG. 11 illustrates a more detailed schematic block diagram of a portion of the powerline gateway of FIG. 10.

FIG. 11 illustrates a more detailed schematic block diagram of the powerline gateway inbound section 168 and powerline gateway outbound section 170 of FIG. 10. As shown, the data processing module 274 includes a multiplexor 301 and a formatting module 300. The multiplexor 301 is operably coupled to receive either received inbound user data 278 or test pattern data 279. The selection is based on an input received via the channel response module 326. The channel response module 326 functions in a similar manner as the channel determination module 226 of FIG. 7. In normal mode, the multiplexor 301 outputs the received inbound user data 278. In test mode, (i.e., in a mode to determine the characteristics of the power lines) the multiplexor 301 outputs the test patterns 279.

The formatting module 300 is operably coupled to receive the output of multiplexor 301 and format the data to produce processed data 280. The formatting of the data is in accordance with the communication convention used within the local area network. For example, the formatting may be packetizing the data, placing the data in a corresponding time frame, and/or any other communication convention for relaying data via a switching fabric.

The modulation module 276 includes a modulator 302, a digital to analog converter 304 and a filter 306. The modulator 302 is operably coupled to receive the processed data 280 and produce therefrom modulated data. The digital to analog converter 304 converts the modulated data into an analog signal that is filtered and outputted as the modulated data 282.

The demodulation module 286 includes a filter 308, an echo cancellation module 310, a summing module 312, an equalizer 314, a ranging module 316, a multipath module 318, an analog to digital converter 320, and a demodulator 322. The functionality of these elements, as well as the functionality of the channel response module 326, is similar to the functionality of corresponding elements of the demodulation module 210 as shown in FIG. 7. While the functionalities are similar, each powerline gateway will determine its own channel response characteristics to provide the necessary equalization for equalizer 314 as well as separate multipath error correction and ranging functions.

The data processing module 290 includes a deformatting module 324 that deformats the data to produce the retrieved user data 296. The deformatting used by deformatting module 324 is the inverse of the protocol used by formatting module 300.

Figure 12:
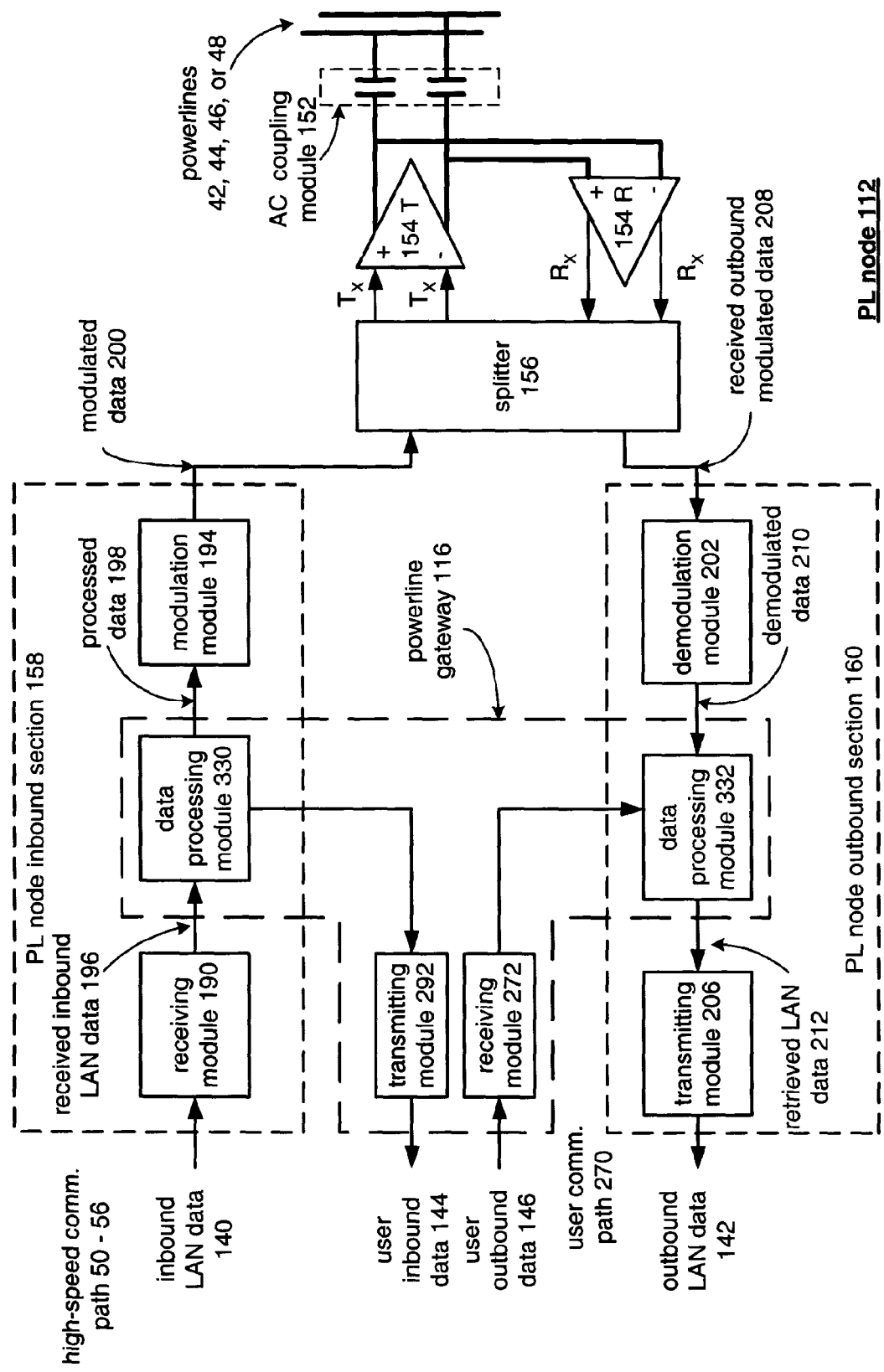
FIG. 12 illustrates a schematic block diagram of an alternate powerline node in accordance with the present invention.

FIG. 12 illustrates a schematic block diagram of the powerline node 112 of FIG. 5. The powerline node 112 includes a powerline node inbound section 158, a powerline gateway 116, a powerline node outbound section 160, splitter 156, transmit and receive power amplifiers 154T and 154R, and an AC coupling module 152. The functionality of splitter 156, power amplifiers 154 and AC coupling module 152 are as previously described.

The powerline node inbound section 158 includes a receiving module 190, data processing module 330, and modulation module 194. The receiving module 190 and the modulation module 194 functions in a similar manner as the same reference numbered modules of FIG. 6. The data processing module 330 is included within the powerline node inbound section 158 as well as within the powerline gateway 116. In operation, the data processing module 330 will identify the user inbound data 144 contained within the inbound local area network data 140. When the data processing module 330 recognizes the user inbound data 144, it provides the data to the transmitting module 292. As such, the user inbound data 144 is not modulated nor is it propagated onto the power lines. The remainder of the inbound local area network data 140 is processed to produce the processed data 198 and propagated via the modulation module 194, splitter 156, power amplifier 154T and AC coupling module 152 onto the power lines.

The powerline node outbound section 160 includes a demodulation module 202, a data processing module 332, and a transmitting module 206. The transmitting module 206 and demodulation module perform in a similar fashion as like referenced elements of FIG. 6. The data processing module 332 is operably coupled to receive demodulated data 210 via the demodulation module 202 and user outbound data 146 via the receiving module 272. The data processing module 332 processes the user outbound data 146 and the demodulated data 210 to produce retrieved local area network data 212. The retrieved local area network data 212 is outputted via transmitting module 206 as output local area network data 142.

The transmitting module 292 and receiving module 272 communicate via the user communication path 270 with the affiliated user of the powerline node 112. As one of average skill in the art will appreciate, by incorporating the powerline node 112 as shown in FIG. 12, the powerline node 112 may be mounted at the home of a user. As such, fiber, or other high-speed communication path, is routed to one individual home within a local area network, or neighborhood, where the powerline node 112 provides the conduit for high-speed communications for other homes within the neighborhood via the power lines without the need for installation of high-speed communication paths to each of the homes in the local area network. Since a substantial portion of the cost of installing a communication system is the equipment of the last 100 feet, the powerline node and powerline gateways of the present invention substantially reduce the cost of bringing broadband communications to users that already have electricity.

Figure 13:
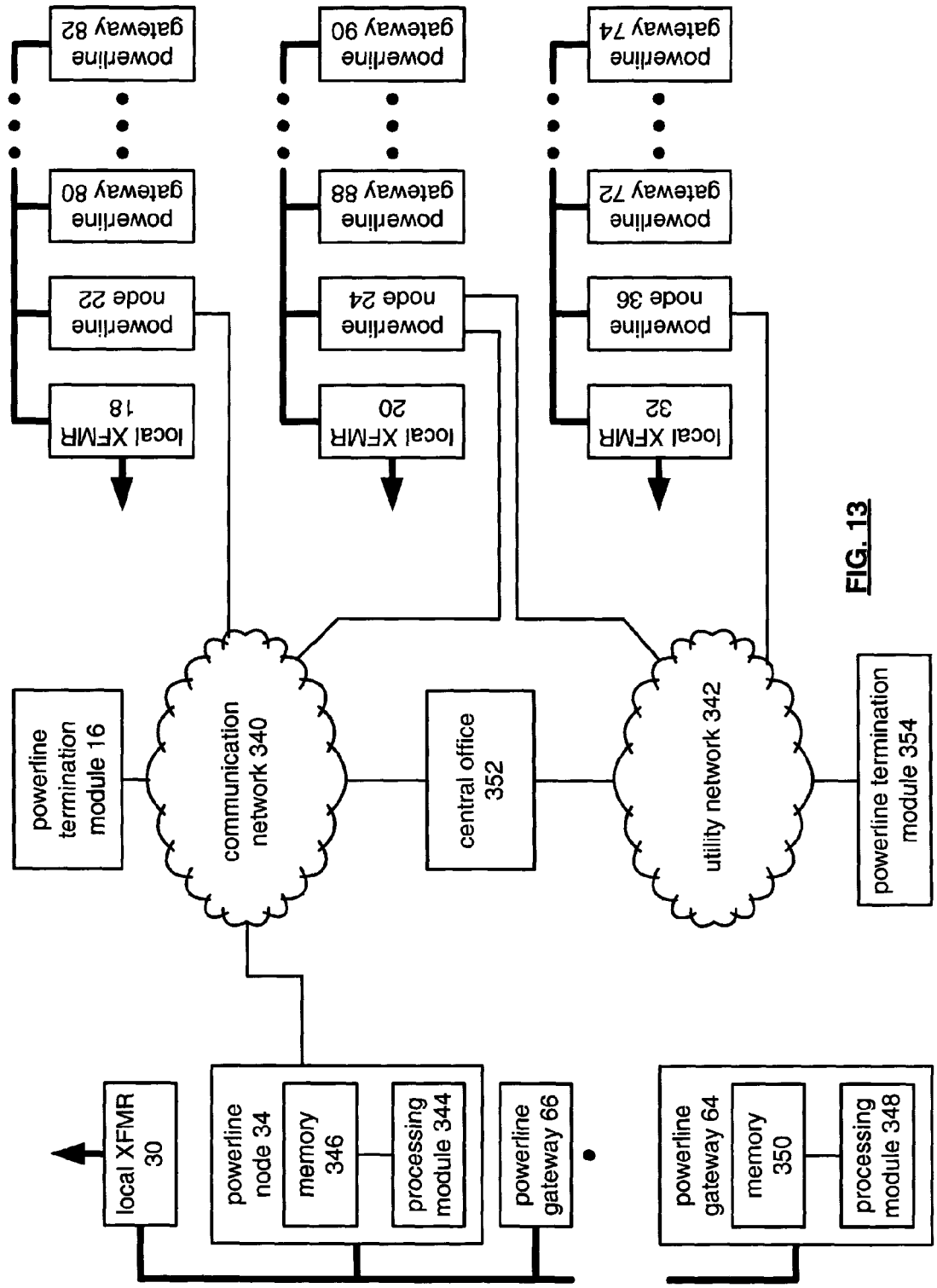
FIG. 13 illustrates a distributed power line based communication system in accordance with the present invention.

FIG. 13 illustrates a schematic block diagram of a distributed power line base communication system. The power line base communication system includes a communication network 340, a utility network 342, a central office 352, a plurality of powerline termination modules 16 and 354, a plurality of powerline nodes 34, 22, 24 and 36, a plurality of local distribution transformers 18, 20, 30 and 32, and a plurality of powerline gateways 64, 66, 72, 74, 80, 82, 88 and 90. In this configuration, the powerline nodes 22, 24, 36, 34 and 36 are coupled via a high-speed communication path to the communication network 340 and/or the utility network 342. The communication network 340 may be the Internet, wide area network, wireless communication system, public switch telephone network, Ethernet network, and/or any other type of networking system.

The utility network 342 is a communication network private to a utility company or power company used to communicate with substations, local distribution transformers, and other nodes within a power system throughout a geographic region. The central office 352 coordinates the communication throughout the communication system of FIG. 13. Each of the powerline termination modules 16 and 354 supports a portion of the system of FIG. 13.

Each of the powerline nodes includes a processing module 344 and memory 346. The processing module 344 may be a single processing device or a plurality of processing devices. Such a processing device may be a microprocessor, micro controller, digital signal processor, state machine, logic circuitry, programmable gate array, analog circuitry, and/or any device that manipulates signals (analog or digital) based on operational instructions. The memory 346 may be a single memory device or a plurality of memory devices. Such a memory device may be a read only memory, random access memory, re-programmable memory, system memory, magnetic tape memory, and/or any device that stores digital information. Note that when the processing module implements one or more of its functions via a state machine, logic circuitry, and/or analog circuitry, the memory storing the corresponding instructions is embedded within the circuitry comprising the state machine, logic circuitry, and/or analog circuitry. The operational instructions stored in memory 346 and performed by processing module 344 are discussed in greater detail with reference to FIGS. 18 through 20.

Each of the powerline gateways includes a processing module 348 and memory 350. The processing module 348 may be a single processing device or a plurality of processing devices. Such a processing device may be a microprocessor, micro controller, digital signal processor, state machine, logic circuitry, programmable gate array, analog circuitry, and/or any device that manipulates signals (analog or digital) based on operational instructions. The memory 350 may be a single memory device or a plurality of memory devices. Such a memory device may be a read only memory, random access memory, re-programmable memory, system memory, magnetic tape memory, and/or any device that stores digital information. Note that when the processing module implements one or more of its functions via a state machine, logic circuitry, and/or analog circuitry, the memory storing the corresponding instructions is embedded within the circuitry comprising the state machine, logic circuitry, and/or analog circuitry. The operational instructions stored in memory 350 and performed by processing module 348 are discussed in greater detail with reference to FIGS. 18 through 20.

As configured, a powerline node may have a high-speed communication path to the communication network 340 and/or to the utility network 342. In this manner, the powerline termination module 16 and/or 354 coordinates the communication via local area networks utilizing networks 340 and/or 342.

FIG. 14 illustrates a graphical representation of processing of inbound local area network data 140 when the data is formatted in accordance with frame based data, such as FDMA, TDMA, et cetera. As shown, the inbound local area network data 140 includes frame sync information and data within a frame. The powerline node 34 receives the inbound local area network data 140 via the high-speed communication path 50. The powerline node 34 identifies the users, and/or addressees, within the frame of information based on time slot allocations within the frame. Having identified each user and its corresponding data, the powerline node 34 uniquely encodes the data based on the users individual encoding and/or encryption mechanism. The data is then time and/or frequency division multiplexed and transmitted as modulated data 200 via the power lines 46 to the powerline gateways 66 and 64. The modulated data will have a varying bit per carrier ratio over the frequency range of interest. This is illustrated as the modulated data 200.

Each of the gateways 64 and 66 will demodulate the modulated data 200 and identify its corresponding timeslot for its respective user. Having done this, the data is decoded and/or decrypted based on the individual encoding and/or encryption of the individual user to retrieve the data contained within the user's timeslot or slots. Such data is then presented as user outbound data 146 or 150 to the respective user.

FIG. 15 illustrates a graphical representation of processing outbound local area network data 142 by powerline node 34. As shown, the outbound local area network data 142 is organized as frames of data. Each frame is separated by frame syncing information such that the alignment of frames can be readily obtained to ensure proper transmission of data. The outbound local area network data 142 is transmitted via the high-speed communication path 50. In this example, each of the powerline gateway 64 and 66 receive user inbound data 144 or 148. The user inbound data is encoded utilizing a unique encoding and/or encryption scheme for the individual users. The encrypted data is then placed in a corresponding timeslot or slots for the individual user and the data is modulated to produce the modulated data 200. In one embodiment, each powerline gateway 66 may have a corresponding frequency bin or plurality of frequency bins to provide its modulated data to the powerline node 34. Alternatively, each of the powerline gateways 64 will transmit its data in a particular time increment utilizing the entire frequency spectrum allocated for demodulated data 200.

The powerline node 34 identifies the users by the carrier frequencies, and/or the time of the data being received. The data is then decoded utilizing the unique decoding scheme and/or decryption scheme for the individual users. The user data is then placed into frames according to timeslot allocations and provided as the output local area network data 142.

FIG. 16 illustrates a graphical representation of the powerline node 34 processing inbound local area network data 140 when the data 140 is packetized data. In this example, the powerline node 34 receives the packets of data via the high-speed communication path 50 using orthogonal frequency division multiplexing (OFDM). The powerline node 34 separates the packets to identify the individual addressees of the data. Utilizing a unique encoding and/or encryption scheme for each user, the separated data is encoded. The encoded packet for each user is then tagged and modulated. The modulated data 200 is provided on power lines 46 to powerline gateways 64 and 66.

Each of the powerline gateways 64 and 66 demodulates the received modulated data 200 to retrieve the packets of data. The packets of data are then identified to determine whether they are addressed for the individual user associated with the powerline gateway. If so, the corresponding data packets are decoded and/or decrypted to retrieve the user outbound data 146 or 150.

FIG. 17 illustrates a graphical representation of producing outbound local area network data 142 in a packetized format. In this illustration, each of the powerline gateways 64 and 66 receive user inbound data 144 or 148 via its corresponding user. Each powerline gateway 64 encodes the corresponding data, packetizes it and then modulates it onto power lines 46. The transmission of the modulated data onto the power lines 46 may be done in a CSMA manner, and/or time allocated manner.

The powerline node 34 receives the outbound modulated data 208 and identifies the particular users. Having identified the particular users, the data is decoded and/or decrypted based on the individual encoding and/or encryption scheme for the corresponding user. The data for the local area network is then packetized and placed on the high-speed communication path 50 as the outbound local area network data 142.

Figure 18:
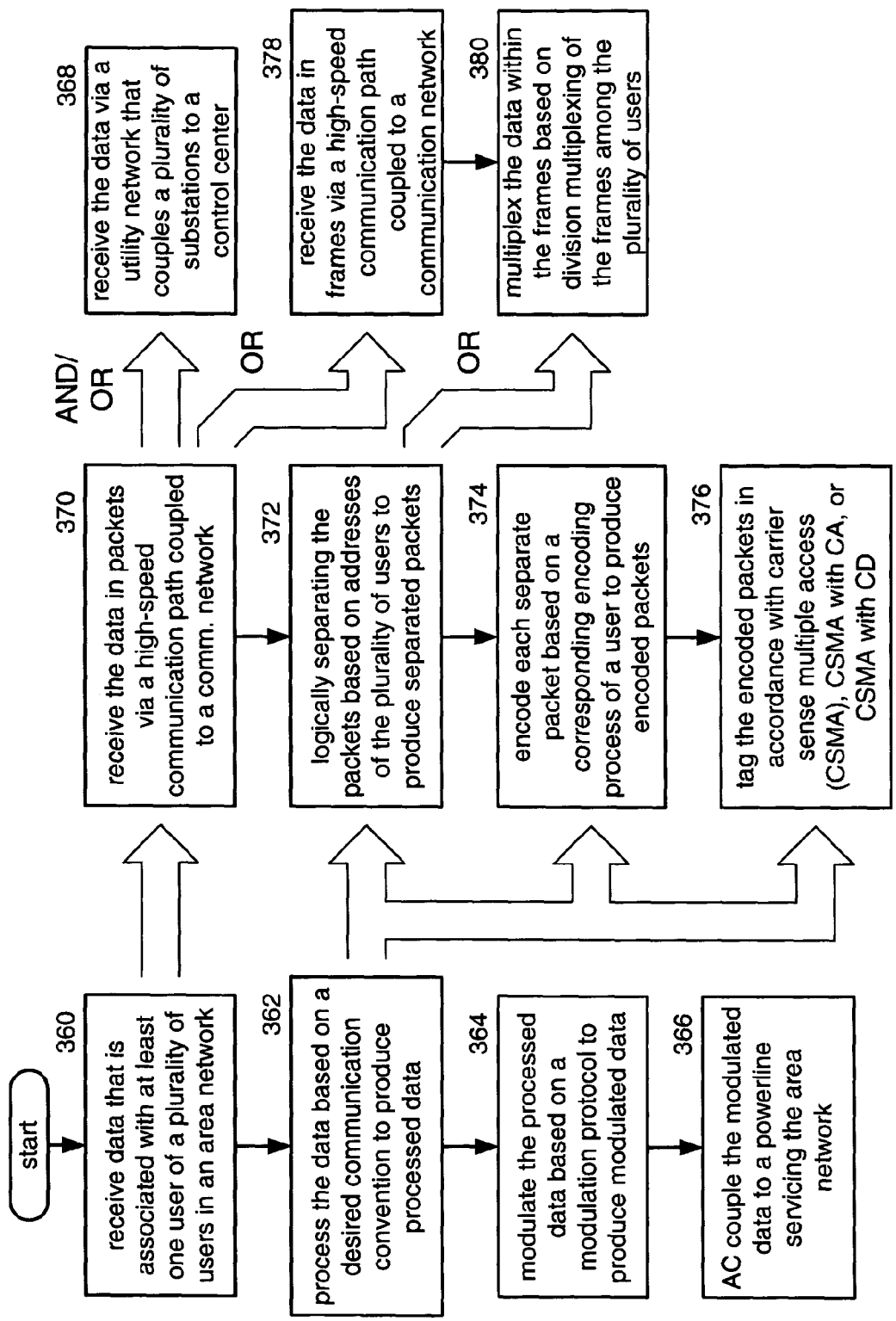
FIG. 18 illustrates a logic diagram of a method for providing broadband communication over power lines in accordance with the present invention.

FIG. 18 illustrates a logic diagram of a method for providing broadband communication over power lines. The process begins at Step 360 where data that is associated with at least one user of a plurality of users in an area network (e.g., wide area network or local area network) is received. The data may be received in a variety of manners, which will be subsequently described. The process then proceeds to Step 362 where the data is processed based on a desired communication convention to produce process data. The desired communication convention may be time division multiplexing, frequency division multiplexing, carrier sense multiple access, CSMA with collision avoidance, CSMA with collision detection, encryption, buffering, frame relay processing, ATM packetizing, and/or any other type of framing of data and/or packetizing of data. A more detailed discussion of the processing of the data in accordance with the desired communication convention will be subsequently described.

The process then proceeds to Step 364 where the processed data is modulated based on a modulation protocol. The modulation protocol may be amplitude modulation, frequency modulation, frequency shift keying, phase shift keying, quadrature amplitude modulation, discrete multi-tone modulation, orthogonal frequency division multiplexing, and/or spread spectrum modulation. The process then proceeds to Step 366 where the modulated data is AC coupled to the power lines servicing the area network. This was graphically illustrated with reference to FIGS. 1 through 7.

The receiving of data may be done in a variety of ways. For instance, at Step 370, the data may be received in packets via a high-speed communication path that is coupled to a communication network. When the data is received in this manner, the processing of the data corresponds to Steps 372 through Step 376. At Step 372, the data is logically separated based on addresses of the plurality of users to produce separated packets of data. The process then proceeds to Step 374 where the separate packets of data are encoded based on a corresponding encoding process of the user. Note that each user of the local area network has an individual encoding scheme and/or encryption scheme. As such, even though the data is placed on a shared communication path, only the addressed user may receive it since only the addressed user has the corresponding encryption/decryption and/or encoding/decoding scheme. The process then proceeds to Step 376 where the encoded packets are tagged in accordance with CSMA, CSMA with collision avoidance, and/or CSMA with collision detection.

As an alternate mechanism for receiving the data, the data may be received as shown at Step 368 where it is received via a utility network. The utility network couples a plurality of substations to a control center. In this coupling, and reception of data, the data is relatively low speed to provide the control central office with remote metering, enabling/disabling of electronic devices within a home, and/or other functions to control the transient use of power within a given area supported by a local distribution transformer and/or substation.

As a further alternate mechanism for receiving the data, the data may be received as shown at Step 378 where it is received in frames via a high-speed communication path coupled to a communication network. If the data is received in this manner, the processing is done as shown in Step 380. At Step 380, the data is multiplexed within the frames based on division multiplexing (e.g., time division multiplexing and/or frequency division multiplexing) of the frames among the plurality of users. This was graphically illustrated in FIGS. 14 and 15.

Figure 19:
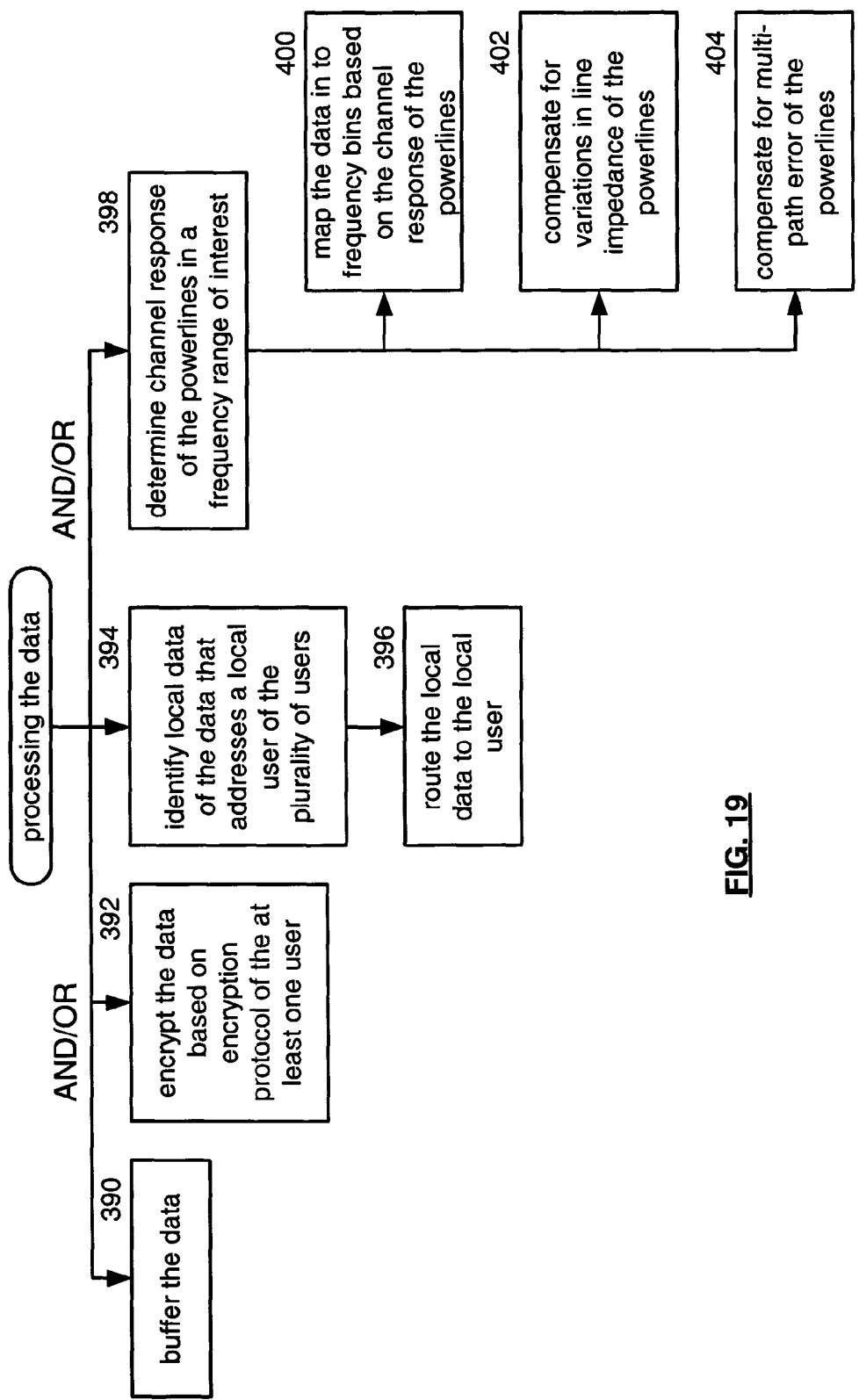
FIG. 19 illustrates a logic diagram of further processing of the data of Step 362 of FIG. 18.

FIG. 19 illustrates a logic diagram of further processing options of the data of Step 362 of FIG. 18. Each of these paths provides alternate and/or cumulative processing of the data. At Step 390, the data may be buffered. At Step 392, the data may be encrypted based on an encryption protocol that is unique to each user within the system. At Step 394, local data may be identified wherein the local data addresses a user affiliated with the powerline node. The process then proceeds to Step 396 where the local data is routed to the local user without further processing.

At Step 398, the processing may include determining the channel response of the power lines over a frequency range of interest. For example, if the data is being transmitted via a plurality of carrier frequencies in the range of 100 kilohertz to 5 megahertz, the channel response in this frequency range is of interest. The process then proceeds to one or more of Steps 400 through 404. At Step 400, the data is mapped into frequency bins based on the channel response of the power lines. At Step 402, variations in the line impedance of the power lines are compensated for based on the response of the power lines. At Step 404, multipath errors are compensated for of the power line in response to determining the power line frequency performance response.

Figure 20:
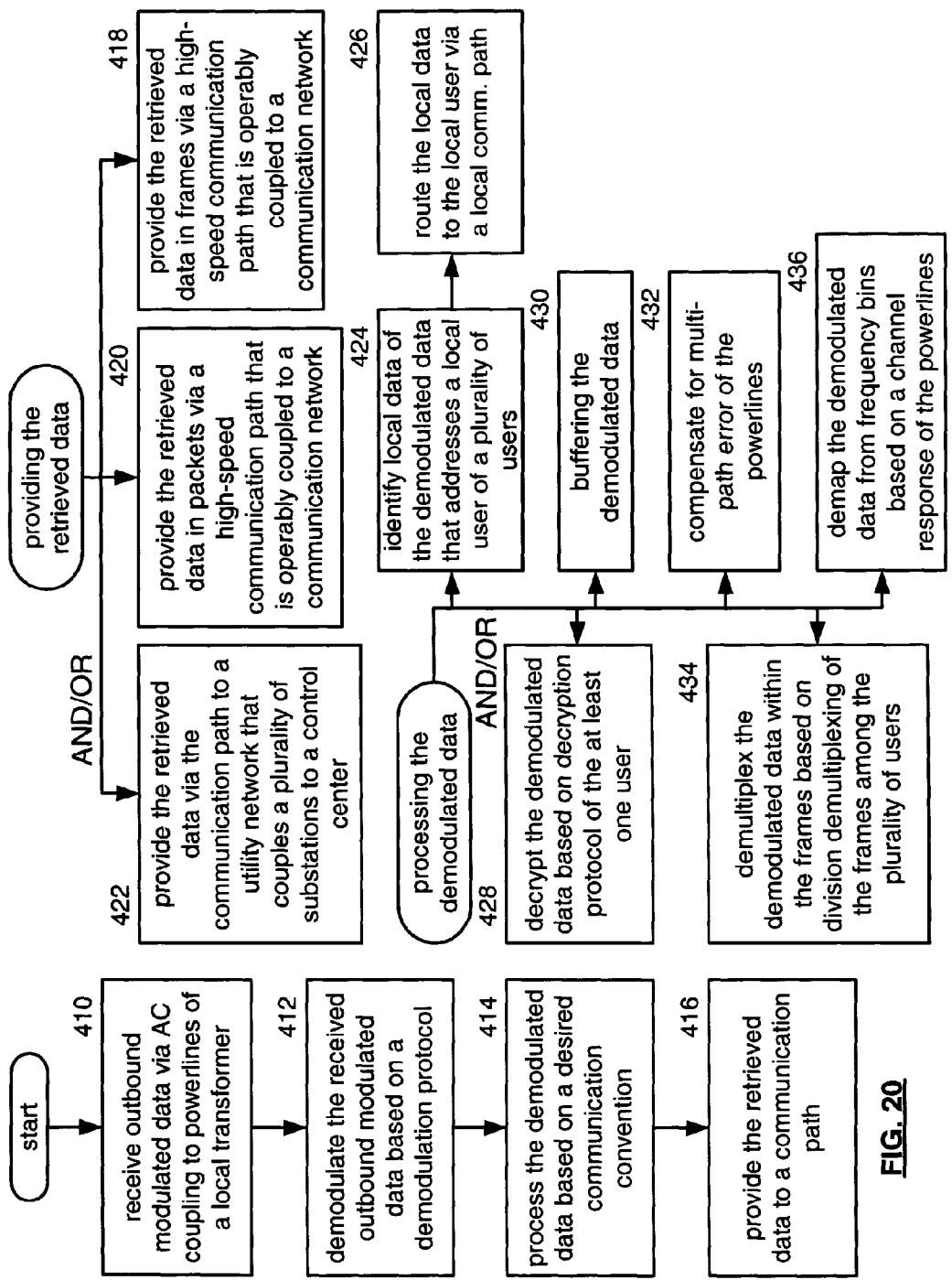
FIG. 20 illustrates a logic diagram of a method for providing broadband communication over power lines in accordance with the present invention.

FIG. 20 illustrates a logic diagram of a method for providing broadband communications over power lines. The process begins at Step 410 where outbound modulated data is received via AC coupling to power lines of a local transformer. The process then proceeds to Step 412 where the received outbound modulated data is demodulated based on a demodulation protocol. The particular demodulation protocol will be the inverse of the modulation protocol used to modulate the data. The process then proceeds to Step 414 where the demodulated data is processed based on the desired communication convention. The processing of the data will be further discussed with reference to Steps 424 through 436. The process then proceeds to Step 416 where the retrieved data is provided to a communication path. The providing of the retrieved data will be further discussed with reference to Steps 418 through 422.

The providing of the retrieved data may include one or more of the processing steps shown in Steps 418 through 422. At Step 418, the retrieved data is provided in frames via a high-speed communication path to a communication network. At Step 420, the retrieved data is provided in packets via a high-speed communication path to a communication network. At Step 422, the retrieved data is provided via a communication path to a utility network that couples a plurality of substations to a control center. Alternately, the retrieved data may be user data and is provided to a user via a user communication path.

The processing of the demodulated data may be done utilizing one or more of the steps represented by Steps 424 through 436. At Step 424, local data of the demodulated data is identified based on the address of a local user of the plurality of users. Once the local data is identified, the process proceeds to Step 426 where the local data is routed to the local user via a local communication path.

At Step 428, the demodulated data may be decrypted based on a decryption protocol of the at least one user wherein the decryption protocol corresponds to the modulation protocol. At Step 430, the demodulated data may be buffered for controlling the timing of processing the data. At Step 432, the demodulated data may be processed to compensate for multipath errors of the power lines.

At Step 434, the demodulated data may be demultiplexed within the frames based on division demultiplexing (time and/or frequency) of the frames amongst the plurality of users. At Step 436, the demodulated data may be demapped from the frequency bins based on a channel response of the power lines.

Figure 21A:
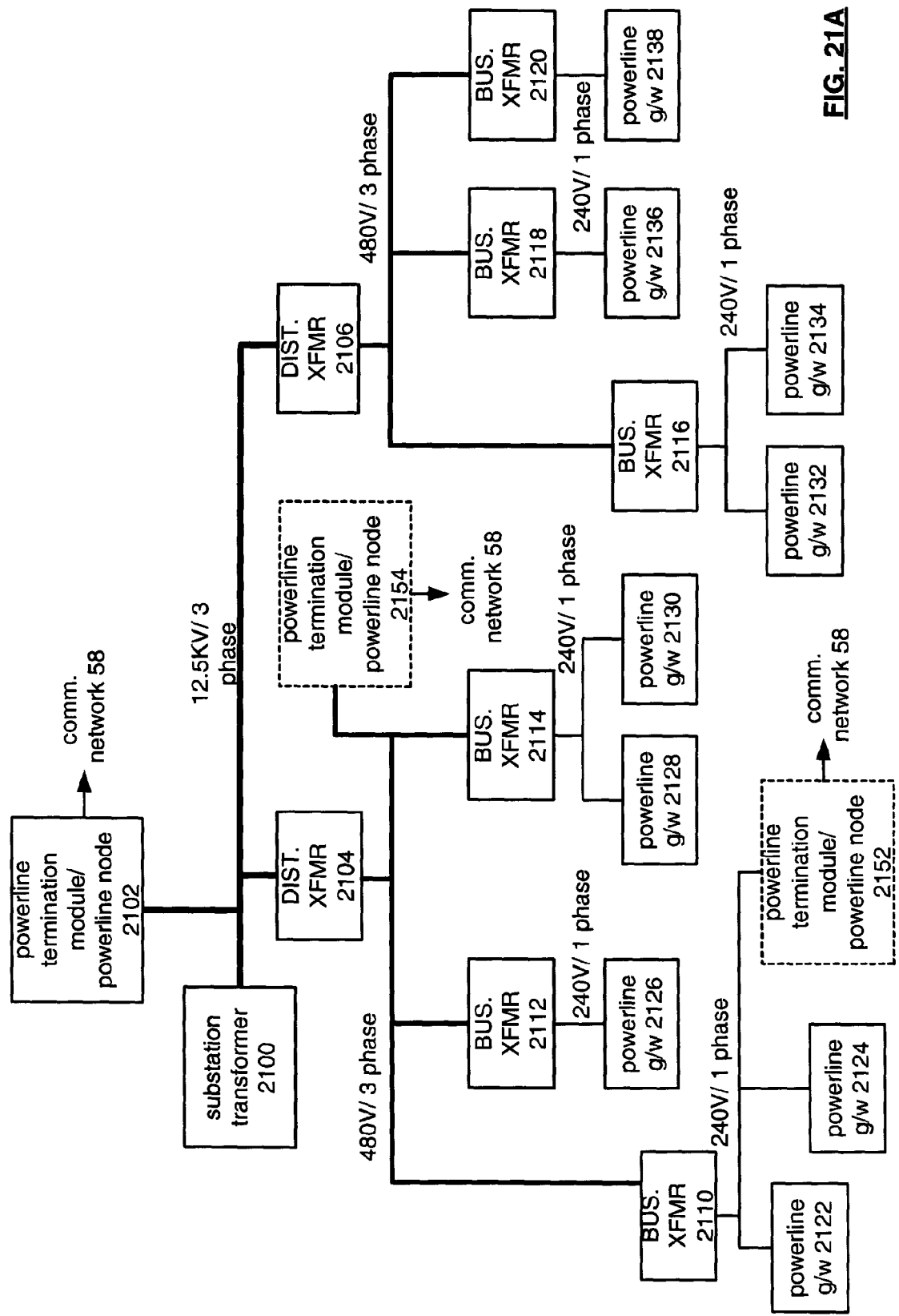
FIG. 21A is a block diagram illustrating various system configurations of the present invention in which one or more transformers reside within signal paths between powerline nodes and powerline gateways.

FIG. 21A is a block diagram illustrating various system configurations of the present invention in which one or more transformers reside within signal paths between powerline nodes and powerline gateways. Three separate powerline termination modules/powerline nodes 2102, 2152, and 2154 are shown in FIG. 21A, any of which could service the high-speed communication requirements of each of the powerline gateways 2122, 2124, 2126, 2128, 2130, 2132, 2134, 2136, and 2138. As is shown in FIG. 21A, however, each of the powerline termination modules/powerline nodes 2102, 2152, and 2154 couple to the power grid at different locations. Thus, when servicing any of the powerline gateways 2122-2138, each of the powerline termination modules/powerline nodes 2102, 2152, and 2154 will use different signal paths through the power grid.

The power grid of FIG. 21A includes a substation transformer 2100 that couples on its high side to a high voltage 3 phase power line, e.g., 138 KV, and services a 12.5 KV/3 phase distribution line on its low side. Distribution transformers 2104 and 2106 couple to the 12.5KV/3 phase distribution line on their high side and service 480V/3 phase lines on their low sides. A plurality of business transformers 2110, 2112, 2114, 2116, 2118, and 2120 couple on their high sides to the 480V/3 phase lines and provide service to businesses at 240V/1 phase voltage levels. Each of the business transformers 2110-2120 services at least one, and at most a few, businesses. Each of the powerline gateways 2122-2138 is shown as coupling to the 240V/1 phase portion of the power grid. However, in other embodiments, some or all of the powerline gateways 2122-2138 could couple to other portions of the power grid.

The transformers and conductors of the power grid are designed to service the low frequency, e.g., 50 Hz, 60 Hz, power signal that is employed to provide electrical utility service to the business customers of the power grid. The operating characteristics of the substation transformer 2100, distribution transformers 2104 and 2106, business transformers 2110-2120, and power lines of the power grid are well understood within this frequency band. However, the high-speed communication system of the present invention operates in a much higher frequency band, e.g., 3-50 MHz. The operational characteristics of the power grid components within this frequency band are not well understood. For example, each of the transformers introduces signal attenuation for data communication signals passing through the transformers, e.g., 20-30 dB.

Further, the operational characteristics of the power grid itself are not well understood within this frequency band. The power grid includes a plurality of conductive paths required to service the electrical utility needs of the customer. However, these conductive paths produce significant reflections when the power grid is used to service high-speed data communications. Further, the various power grid components that provide benefit for power factor correction, e.g., capacitor banks, may significantly affect the ability to use the power grid to service high-speed data communications. The input impedance seen by the powerline nodes and the powerline gateways may be such as to limit the ability of the devices to transmit signals within the power grid. Further, the power grid itself may offer varying impedance to the devices and cause frequency selective amplitude and phase distortion.

Figure 21B:
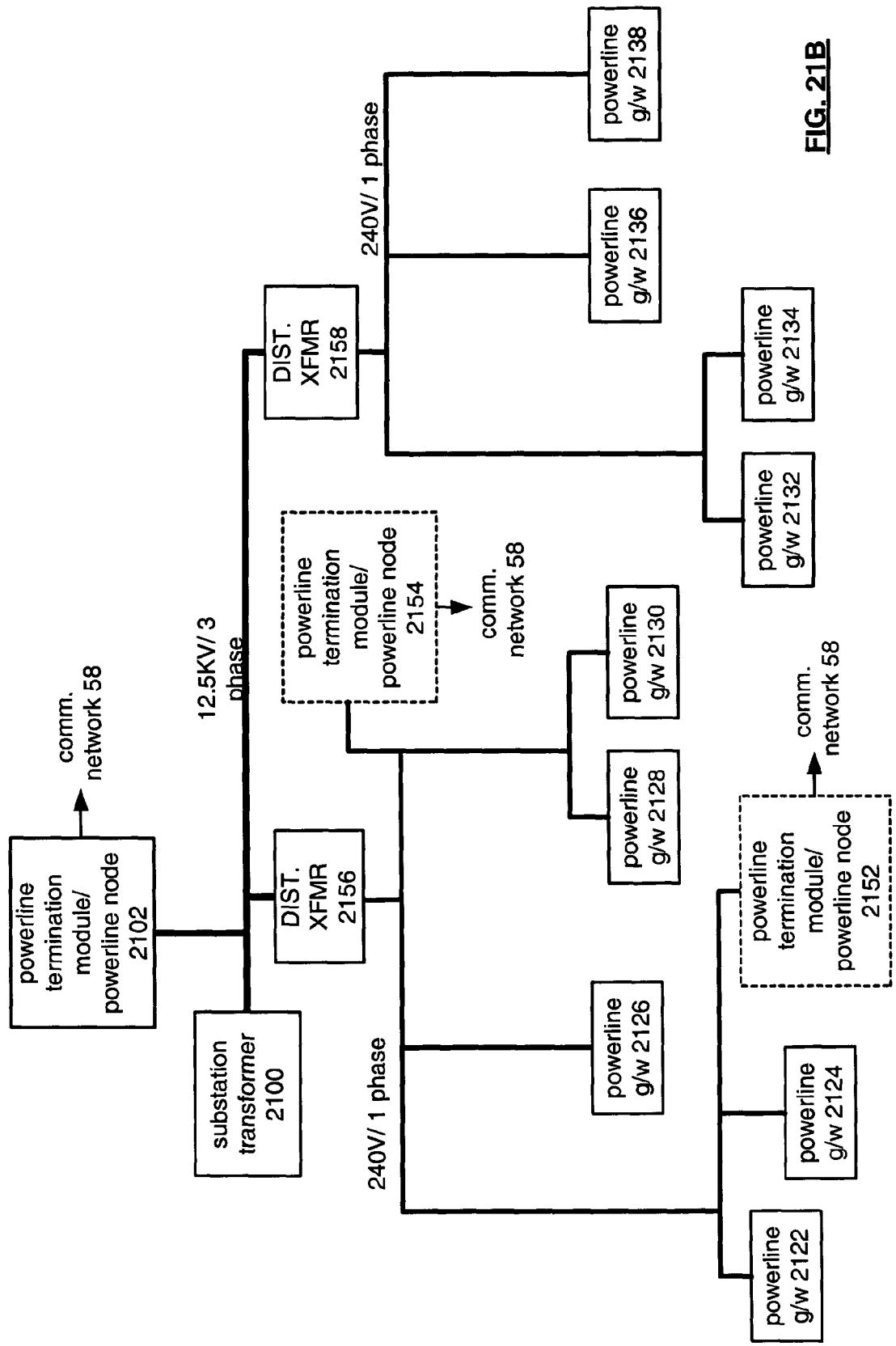
FIG. 21B is a block diagram illustrating another system configuration of the present invention in which one or more transformers reside within signal paths between powerline nodes and powerline gateways.

FIG. 21B is a block diagram illustrating another system configuration of the present invention in which one or more transformers reside within signal paths between powerline nodes and powerline gateways. As contrasted to the structure of FIG. 21A, the structure of FIG. 21B includes only the 12.5KV/3 phase and 240V/1 phase lines of the power grid. In this case, distribution transformers 2156 and 2158 couple on their high sides to the 12.5KV/3 phase voltage and couple on their low sides to the 240V/1 phase lines. Each of the powerline gateways 2122-2138 couple to the 240V/1 phase lines and corresponding homes are serviced at this same voltage. As was the case with the structure of FIG. 21A, powerline node 2102 couples to the 12.5KV/3 phase line while powerline nodes 2152 and 2154 couple to the 240V/1 phase lines.

The structure of FIG. 21B is typically more common in a residential area while the structure of FIG. 21B is more typical in a commercial/industrial area. Of course, the teachings of the present invention apply equally as well to commercial/industrial areas as well as to strictly residential area. Further, the system of the present invention may be employed to service a mixed commercial/industrial and residential neighborhood.

FIGS. 22A-22E are block diagrams illustrating various embodiments of the systems of FIGS. 21A and 21B particularly considering the various signal paths provided between transmitter-receiver pairs. As shown in FIG. 22A, in one configuration of the system of FIG. 21A, a signal path from a powerline node 2102 to a powerline gateway 2126 includes distribution transformer 2104 and home transformer 2112 as well as particular components of the 12.5KV/3 phase, 480V/3 phase, and 240V/1 phase power grid. Because the signal path of FIG. 22A includes two transformers, repeater 2202 is required to boost the signal. FIG. 22B illustrates another signal path of the system of FIG. 21A in which a signal path from powerline node 2154 to powerline gateway 2130 includes a portion of the 480V/3 phase grid, the business transformer 2114, and a portion of the 240V/1 phase grid.

FIG. 22C illustrates a signal path of the system of FIG. 21B in which a signal path from powerline node 2102 to powerline gateway 2136 includes a portion of the 12.5V/3 phase grid, the distribution transformer 2156, and a portion of the 240V/1 phase grid. FIG. 22D illustrates another signal path of the system of FIG. 21B in which a signal path from powerline node 2152 to powerline gateway 2138 includes a portion of the 240V/1 phase grid, distribution transformer 2156, a portion of the 12.5V/3 phase grid, the distribution transformer 2158, and another portion of the 240V/1 phase grid. As was the case with FIG. 22A, because the signal path includes two transformers, repeater 2202 is required to boost the signal.

Finally, in the configuration of FIG. 22E, a signal path from powerline node 2152 to powerline gateway 2122 includes simply portions of the 240V/1 phase power grid. Thus, as is shown in FIGS. 22A-22E, when serving the powerline gateways, a powerline node will use different signal paths, each of which has its own unique characteristics. Several of these signal paths will include a single transformer in series. Several of these signal paths will include multiple transformers in series. Further, each of these signal paths has its own unique frequency dependent input reflection/transmission, frequency dependent input impedance characteristics, and frequency dependent series impedance characteristics. Because of the difficulty of installing repeaters to service the communication signals, it is desirable to service all signal paths simply service all receiver/transmitter pairs without repeaters, even when the signal paths include series transformers.

Figure 23:
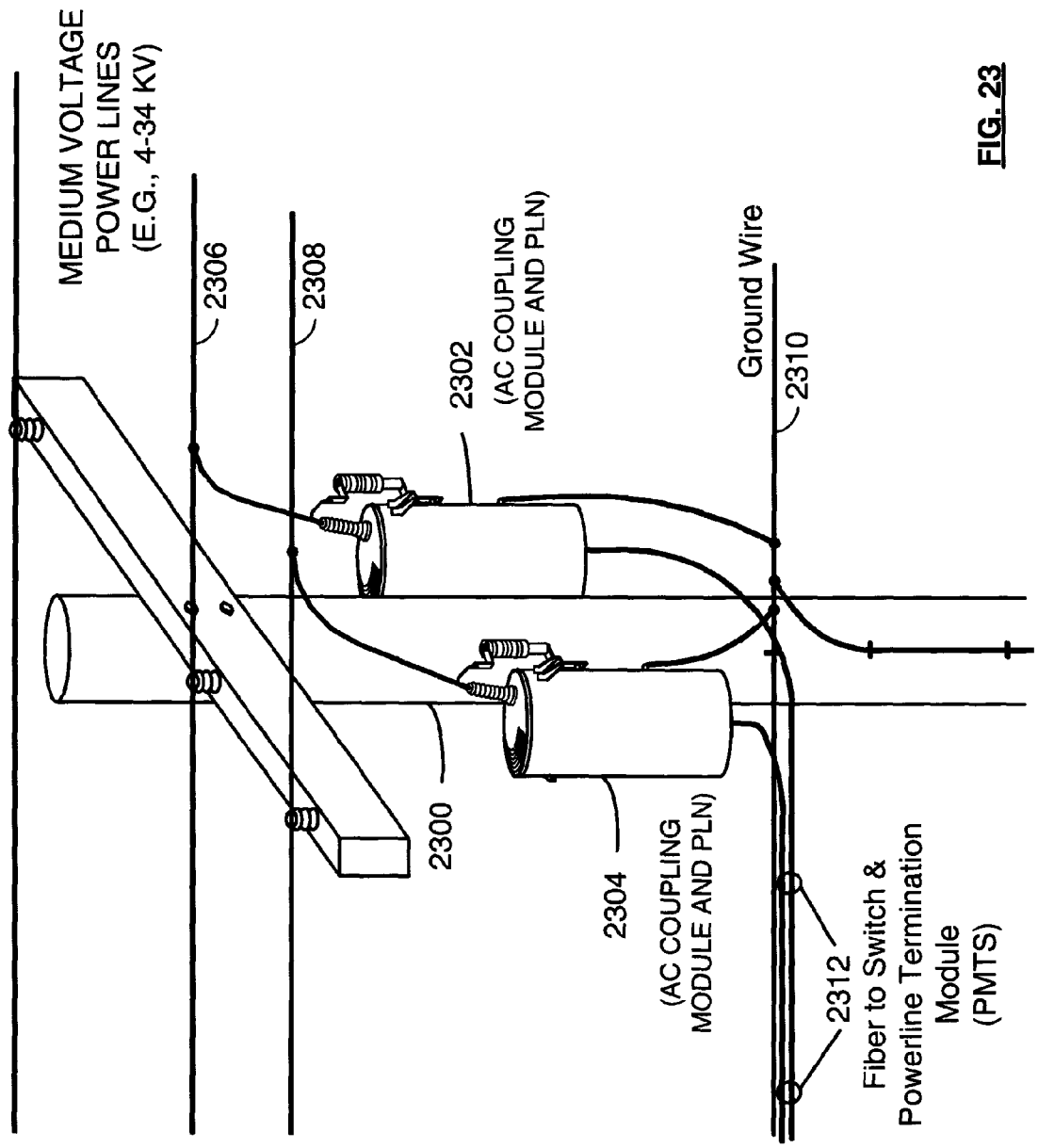
FIG. 23 is a diagrammatic perspective view of two utility pole mounted powerline node/AC coupling modules constructed according to the present invention.

FIG. 23 is a diagrammatic perspective view of two utility pole mounted powerline node/AC coupling modules constructed according to the present invention. The utility pole mounted powerline node/AC coupling modules 2302 and 2304 mount upon a utility pole 2300. The utility pole mounted powerline node/AC coupling modules 2302 and 2304 couple to medium voltage power lines 2306 and 2308, respectively, couple to a ground wire 2310, and couple to fiber optic cables 2312. The fiber optic cables 2312 couple the utility pole mounted powerline node/AC coupling modules 2302 and 2304 to a serving powerline termination module. The utility pole mounted powerline node/AC coupling modules 2302 and 2304 couple high speed communications between the medium voltage power lines 2306 and 2308 and the serving powerline termination module via the fiber optic cables 2312. The utility pole mounted powerline node/AC coupling modules 2306 and 2308 perform the functions described with reference to the powerline nodes and AC coupling modules of FIGS. 1-22.

Figure 24:
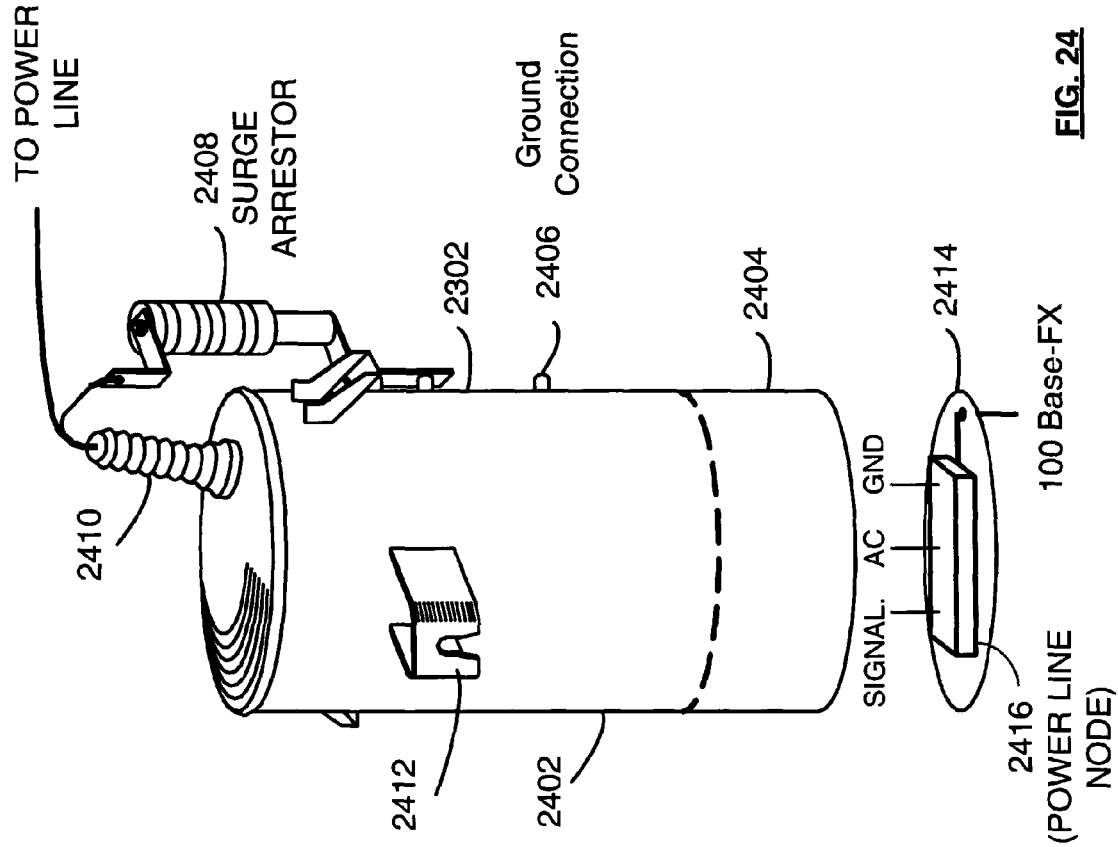
FIG. 24 a partially exploded diagrammatic perspective view of the utility pole mounted powerline node/AC coupling module of FIG. 23.

FIG. 24 a partially exploded diagrammatic perspective view of the utility pole mounted powerline node/AC coupling module 2302 of FIG. 23. The utility pole mounted powerline node/AC coupling module 2302 includes a housing upper portion 2402, a housing lower portion 2404, a ground connection 2406, a surge arrestor 2408, an insulator 2410, a mounting bracket 2412, and a powerline node assembly 2414. The mounting bracket 2412 is employed to mount the powerline node/AC coupling module 2302 to the utility pole. The ground connection 2406 connects to ground wire 2310 (that couples to other poles and to a local ground). The insulator 2410 insulates a conductor that couples to the medium voltage power line 2306 from the grounded metal case of the module 2302. The surge arrestor 2408 couples on a first side to the conductor at the medium voltage and to the housing upper portion 2402 on a second side. The surge arrestor 2408 serves to protect the AC coupling module and powerline node 2416 contained within the housing lower portion 2404.

The powerline node assembly 2414 contains the powerline node 2416 that couples to a fiber optic cable, e.g., 100 Base-FX cable. The powerline node assembly 2414 couples to an AC coupling module that will be described in detail with reference to FIG. 25 and that is contained within the housing upper portion 2402. Three electrical connections are required for the powerline node 2416 to perform its operations: a signal connection, an AC power connection, and a housing ground connection. When in place, the powerline node 2416 is contained completely within the housing lower portion 2404. Resultantly, the powerline node 2416 is protected from the elements. Insulating oil is contained within the housing upper portion 2402 to insulate and cool a transformer contained therein. Thus, the housing upper portion 2402 is separated from the housing lower portion 2404 by an internal wall (not shown) that serves as a barrier to the insulating oil. A first bushing in this internal wall allows the signal connection to pass while a second busing allows the AC power connection to pass. The ground connection of the powerline node assembly 2414 couples directly to the housing lower portion 2404.

Figure 25:
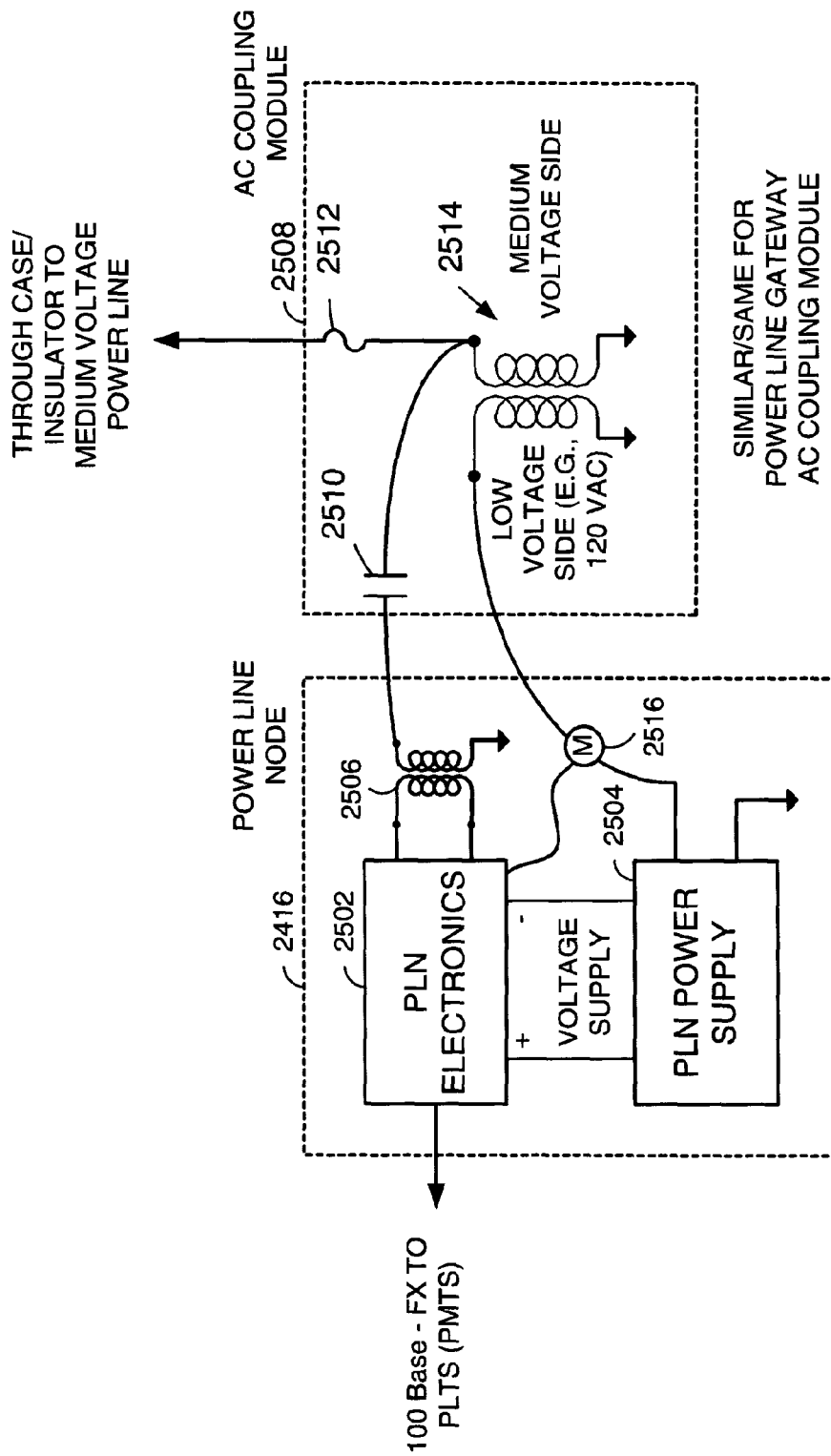
FIG. 25 is a schematic diagram illustrating an equivalent circuit of the utility pole mounted powerline node/AC coupling module of FIG. 23.

FIG. 25 is a schematic diagram illustrating an equivalent circuit of the utility pole mounted powerline node/AC coupling module 2302 of FIG. 23 and FIG. 24. The AC coupling module 2508 is contained within the housing upper portion 2402 and includes an in-line fuse 2512 that couples a transformer 2514 medium voltage side winding to the medium voltage power line via the insulator 2410. The transformer 2514 low side produces a low voltage of 120 volts, for example. A coupling capacitor 2510 (having approximately 2000 picofarads of capacitance) couples to the transformer 2514 medium voltage side winding and is employed by the powerline node 2416 for signal coupling/decoupling. The transformer 2514 low side is used for powering the powerline node 2416.

The powerline node 2416 includes powerline node electronics 2502, a powerline node power supply 2504, and an isolation transformer 2506. The isolation transformer 2506 couples between the powerline node electronics 2502 and the coupling capacitor 2510 of the AC coupling module 2508. The powerline node power supply 2504 couples to the low side of the transformer 2514 of the AC coupling module 2508 and supplies power to the powerline node electronics 2502. The isolation transformer 2506 provides isolation functions (and voltage transformation functions in some embodiments) for the powerline node electronics 2502. The powerline node electronics 2502 also couple to a fiber optic cable over which the powerline node 2416 communicates with a servicing powerline termination module. The powerline node 2416 may also include a meter 2516 that meters the power usage of the powerline node 2416. The powerline node electronics 2502 reports the usage indicated by the meter 2516 to the serving utility company.

Figure 26:
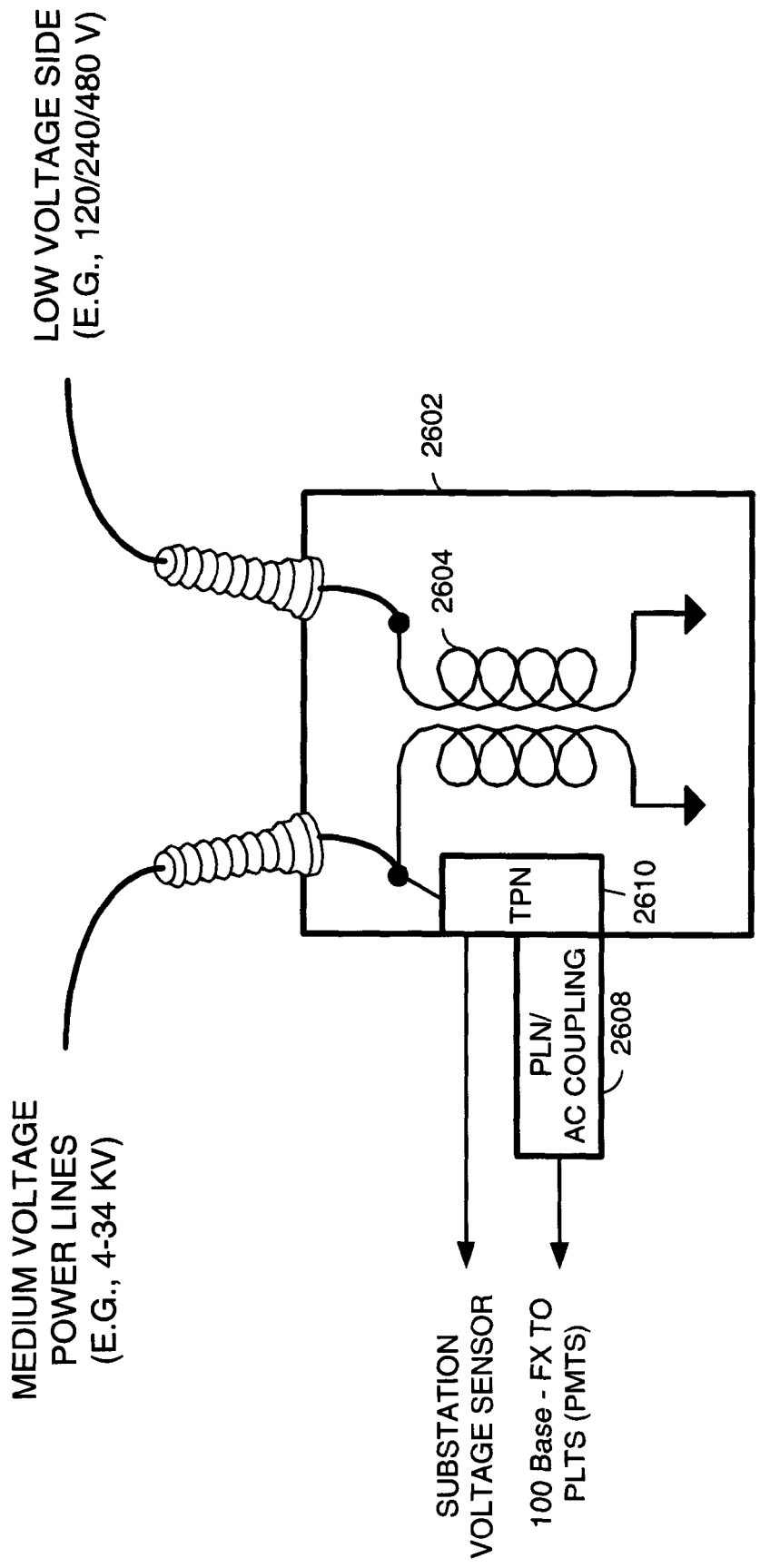
FIG. 26 is a schematic diagram of a dead front transformer/ powerline node/AC coupling module according to the present invention.

FIG. 26 is a schematic diagram of a dead front transformer/powerline node/AC coupling module according to the present invention. The dead front transformer 2602 includes a winding 2604 that couples on a high side to a medium voltage power line and on a low side to a low voltage power line. For simplicity in description only a single phase of the dead front transformer 2602 is illustrated. However, in some constructs, the dead front transformer 2602 includes three phases. A Test Point Network (TPN) 2610 couples to the high side of the winding 2604, to a powerline node/AC coupling module 2608, and to a substation voltage sensor. The powerline node/AC coupling module 2608 couples to the TPN 2610 and to a fiber optic cable that supports communications with a servicing powerline termination module. In a multiple phase transformer, each phase to which communication signals are coupled/decoupled will have a respective TPN 2610 and a respective powerline node/AC coupling module 2608.

Figure 27:
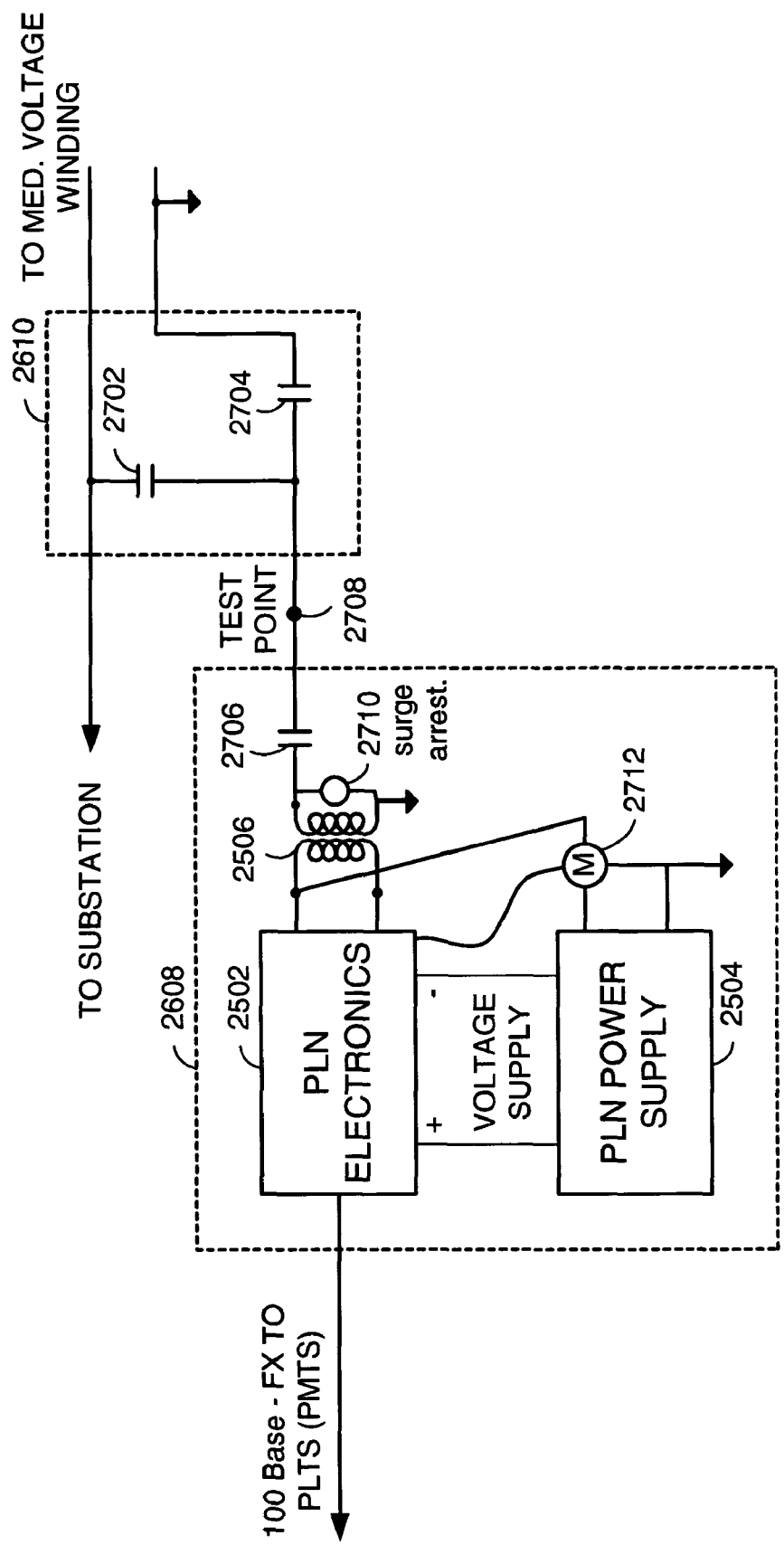
FIG. 27 is a schematic diagram illustrating an equivalent circuit of the dead front transformer/powerline node/AC coupling module of FIG. 26.

FIG. 27 is a schematic diagram illustrating an equivalent circuit of the dead front transformer/powerline node/AC coupling module of FIG. 26. As shown, the TPN 2610 couples to the medium voltage winding of the transformer 2604 and to a ground of the transformer, e.g., case. The TPN 2610 includes capacitor 2702 and capacitor 2704. The TPN 2610 also includes a test point 2708 that is used to couple signals to/decouple signals from the high side winding of the dead front transformer 2602. The powerline node/AC coupling module 2608 includes a coupling capacitor 2706 (having approximately 1000 picofarads to 0.1 microfarads of capacitance) that couples between the test point 2708 of the TPN 2610 and an isolation transformer 2506 of the power line node/AC coupling module 2608. The powerline node/AC coupling module 2608 also includes a surge arrestor 2710 coupled across the high side winding of the isolation transformer 2506 and provides surge protection for the isolation transformer 2506, the powerline node electronics 2502 and the powerline node power supply 2504. The powerline node power supply 2504 receives input power from a low side of the isolation transformer 2506. The powerline node electronics 2502 couple/decouple signals at the high side of the isolation transformer 2602. The powerline node 2608 may also include a meter 2712 that meters the power usage of the powerline node 2608. The powerline node electronics 2502 reports the usage indicated by the meter 2712 to the serving utility company.

Figure 28:
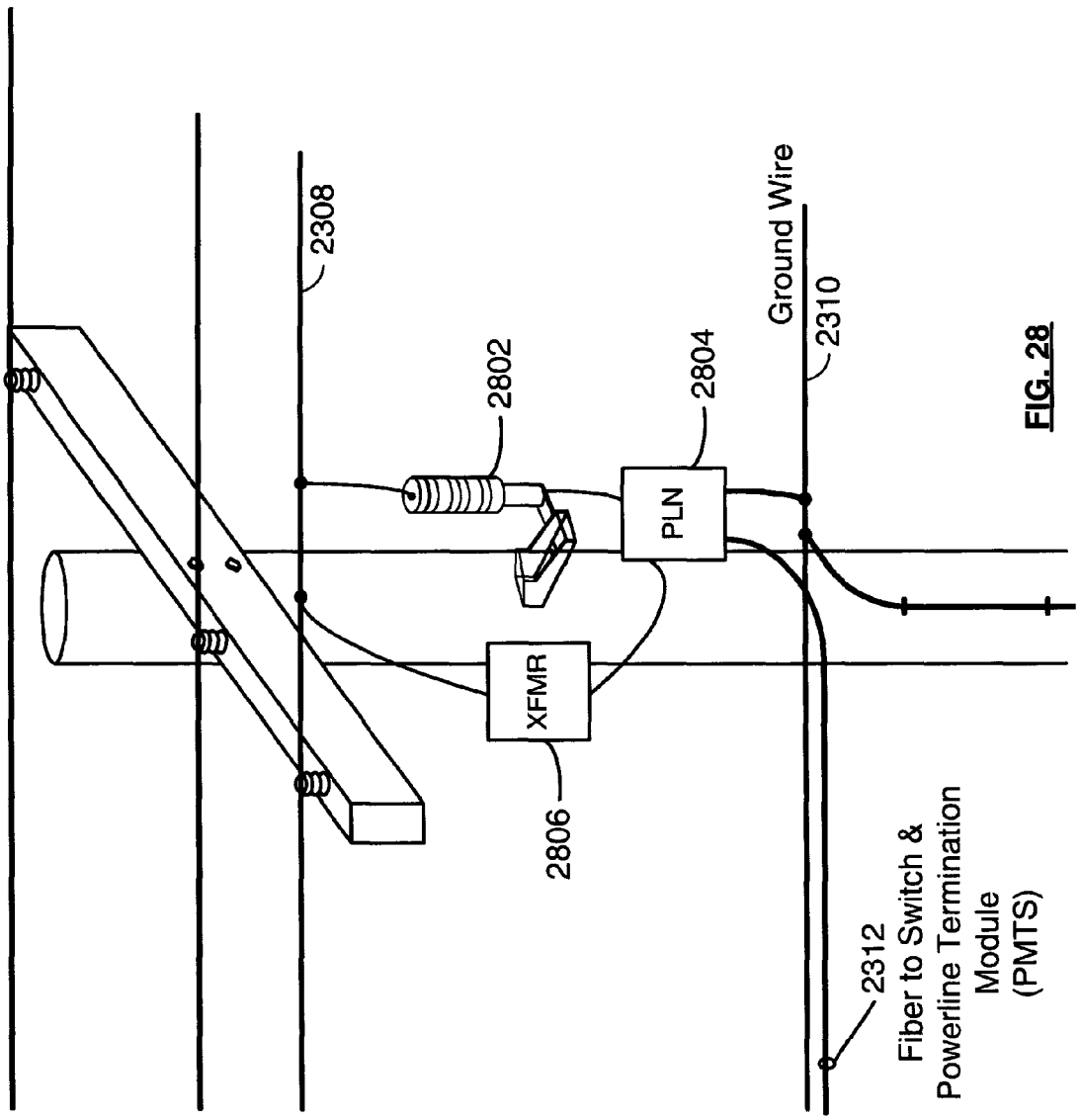
FIG. 28 is a diagrammatic perspective view of a surge arrestor/powerline node constructed according to the present invention.

FIG. 28 is a diagrammatic perspective view of a surge arrestor/powerline node constructed according to the present invention. The surge arrestor 2802 is utility pole mounted, couples on a first side to medium voltage power line 2308, and couples on a second side to a powerline node 2804. The characteristic capacitance of an air-gap type surge arrestor 2802 is approximately 80 picofarads while the characteristic capacitance of a solid-state type surge arrestor is approximately 1000 picofarads. For the system of the present invention, a surge arrestor 2802 having sufficient capacitance must be selected. In the embodiment of FIG. 28, the powerline node 2804 couples to a ground side of the surge arrestor 2802. Thus, the surge arrestor 2802 does not provide surge-arresting functions for the medium voltage power line 2308 but only serves as an AC coupling module for the powerline node 2804.

The powerline node 2804 couples/decouples communication signals to the medium voltage powerline 2308 via the surge arrestor 2802. Further, the powerline node 2804 communicates with its serving powerline termination module via a fiber optic cable 2312. With the powerline node 2804 in the configuration of FIG. 28, the powerline node 2804 receives power from a servicing transformer 2806. The structure of the powerline node 2804 of course will vary depending upon its source of power.

Figure 29:
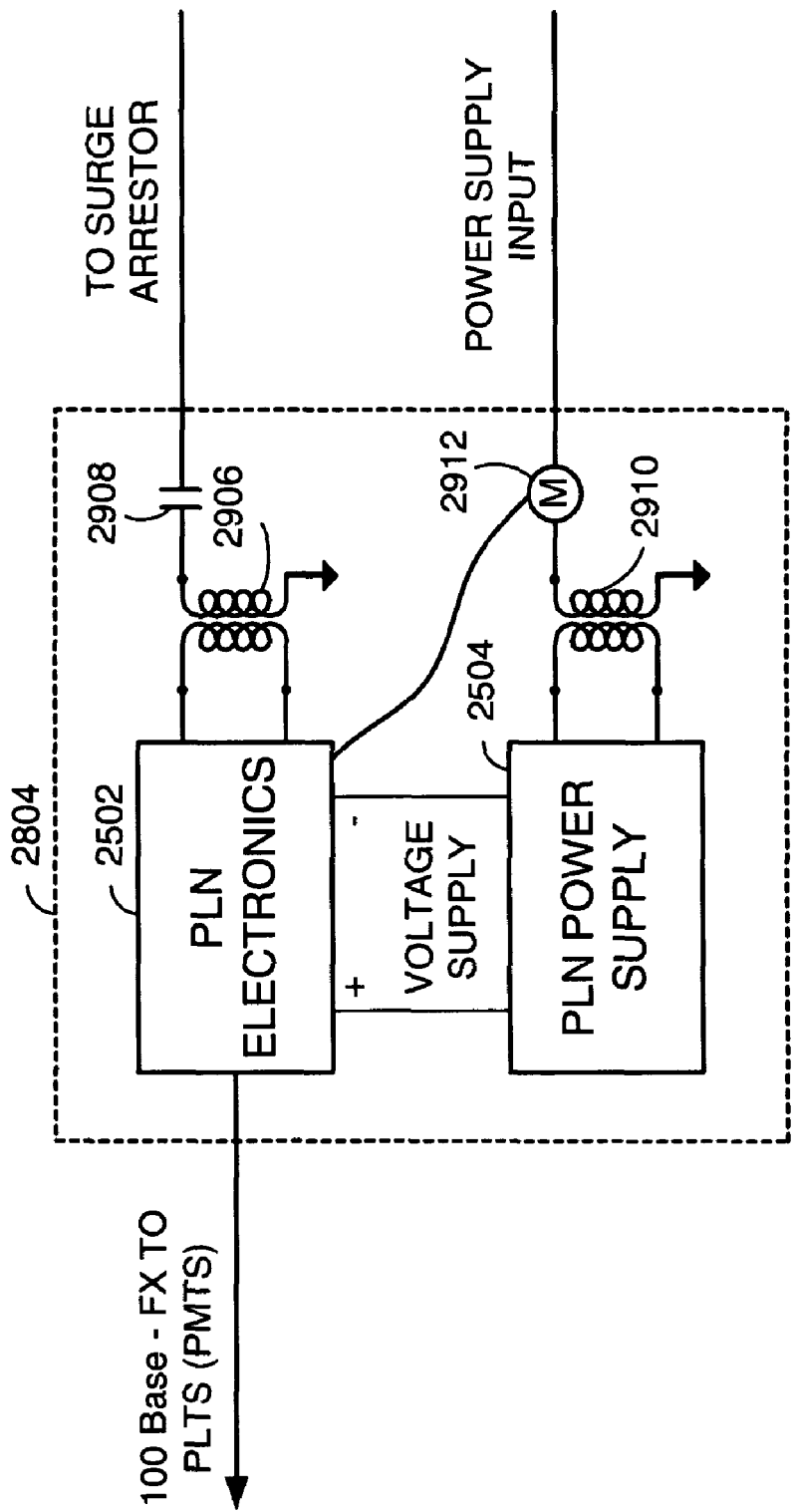
FIG. 29 is a schematic diagram illustrating an equivalent circuit of the surge arrestor/powerline node of FIG. 28.

FIG. 29 is a schematic diagram illustrating an equivalent circuit of the surge arrestor/powerline node of FIG. 28. The powerline node 2804 includes powerline node electronics 2502 and a power supply 2504. The powerline node electronics 2502 couple to a ground connection of the surge arrestor 2802 via isolation transformer 2906 and coupling capacitor 2908 (having approximately 1000 picofarads to 0.1 microfarads of capacitance). The power supply 2504 receives its powering input from transformer 2910 when the power supply input must be stepped down for use. When a power supply is provided at a usable level by the power supply 2504, the transformer 2910 is not required but may still be employed for isolation purposes. The powerline node 2804 may also include a meter 2912 that meters the power usage of the powerline node 2804. The powerline node electronics 2502 reports the usage indicated by the meter 2912 to the serving utility company.

Figure 30:
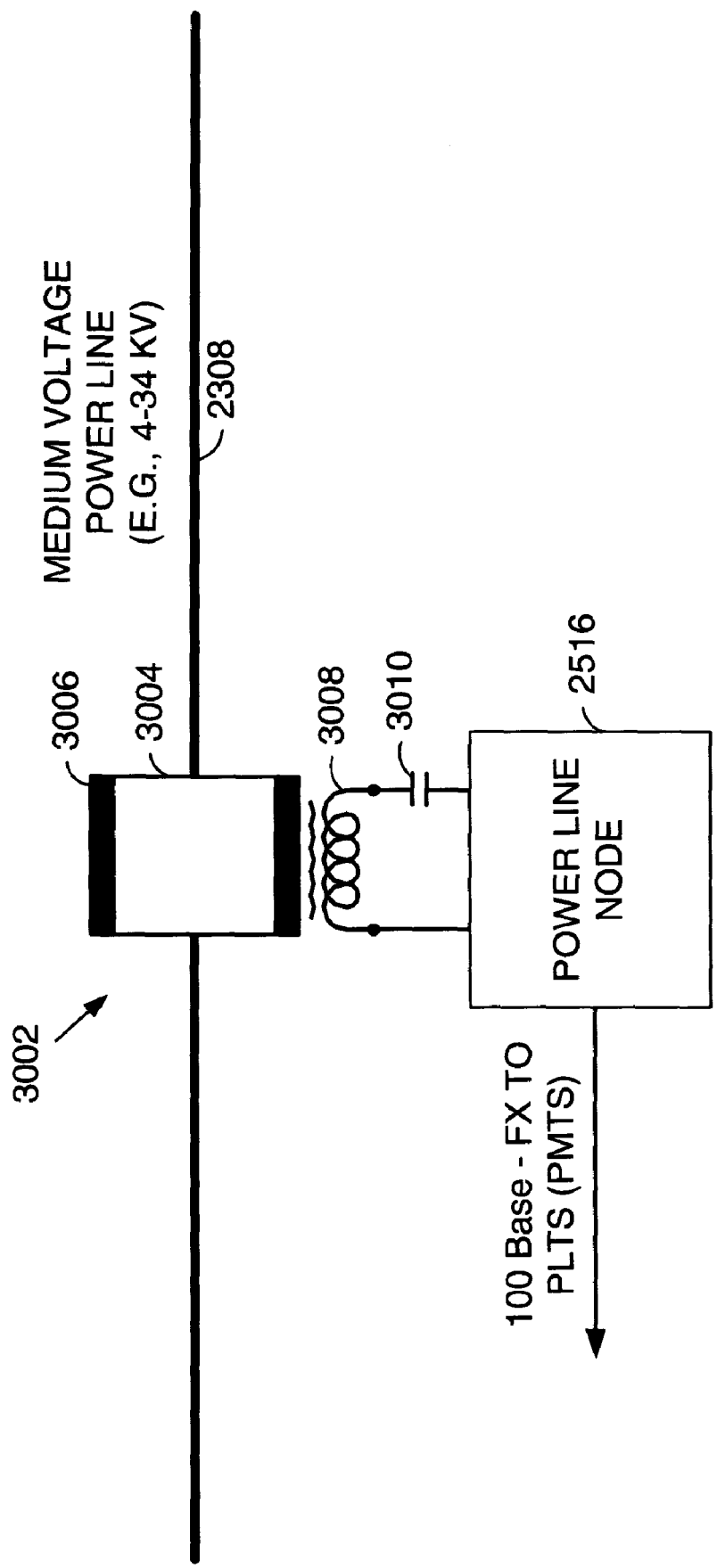
FIG. 30 is a diagrammatic view of an inductive coupler that serves as an AC coupling module according to the present invention.

FIG. 30 is a diagrammatic view of an inductive coupler that serves as an AC coupling module according to the present invention. The inductive coupler 3002 includes a dielectric core 3004 that couples directly to the medium voltage power line 2308 and that serves to physically separate a winding 3006 from the medium voltage power line 2308. A signal coupling winding 3008 and a coupling capacitor 3010 couple a powerline node 2516 to the inductive coupler 3002.

In one embodiment, the dielectric core 3004 of the inductive coupler 3002 has an inner opening that corresponds to the diameter of the medium voltage power line 2308 and an outer diameter of approximately 10-15 centimeters for a 4-34 KV power line. The inner diameter is approximately 2-6 centimeters for a 4-34 KV power line. The winding 3006 of the inductive coupler 3002 has an inner diameter corresponding to the outer diameter of the dielectric core 3004. The number of windings of the winding 3006 depends upon the particular construction of the inductive coupler 3002 and the signal coupling transformer 3008. The inductive coupler 3002 may also be used for applying signals at the test point of a dead front transformer or to higher voltage connections within or adjacent medium voltage transformer leads.

Figure 31:
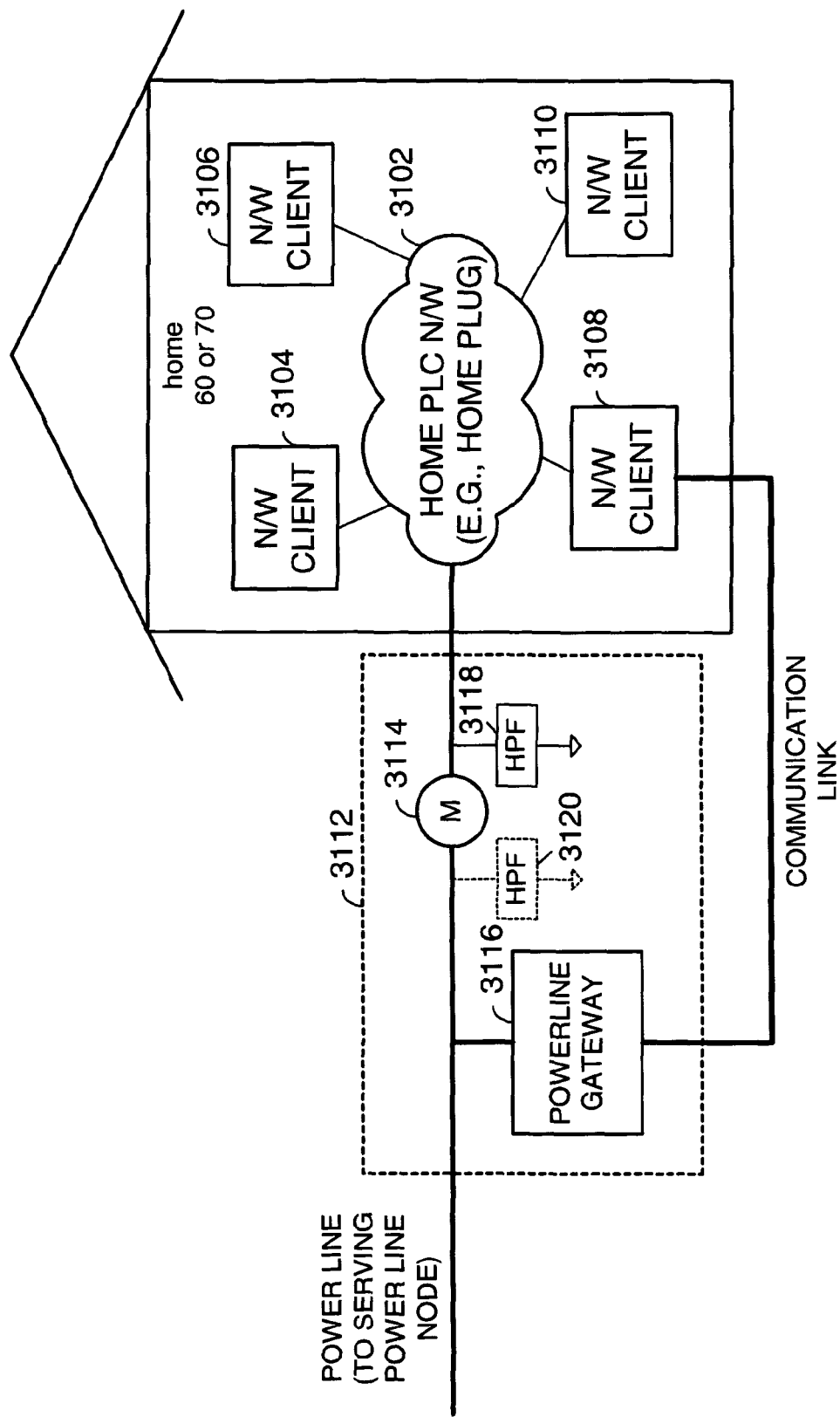
FIG. 31 is a system diagram illustrating coexistence of a power line based communication system of the present invention and a home power line carrier system.

FIG. 31 is a system diagram illustrating coexistence of a power line based communication system of the present invention and a home power line carrier system. A home 60 or 70 has existent therein power wiring that distributes electrical power at 110 VAC, typically. The power wiring of the home 60 or 70 is also used to service a home Power Line Carrier (PLC) network 3102. The PLC network 3102 may operate according to the Home Plug standard, for example. The PLC network 3102 services network clients 3104, 3106, 3108, and 3110 via the power wiring of the home 60 or 70.

A powerline gateway 3116 provides high-speed data communication service to the home 60 or 70. In the particular embodiment of FIG. 31, high-speed data communication service is coupled to PLC network 3102 client 3108 via a communication connection, e.g., Ethernet connection. In this configuration, high-speed data communication service is provided to all PLC network 3102 clients 3104, 3106, and 3108 via the powerline gateway 3116 and client 3108.

In order to prevent interference between the PLC network 3102 communications and the powerline communications serviced via the powerline gateway 3116, a powerline gateway/meter 3112 includes at least one high pass filter 3118 and/or 3120 that shunts all communication signals to ground. In this manner, communication signals coupled on the powerline by a servicing powerline node are shunted to ground before they enter the power wiring of the home 60 or 70 where they would otherwise interfere with the PLC network 3102. Likewise, all communication signals coupled on the power line wiring of the home 60 or 70 by the PLC network 3102 are shunted to ground before they enter the power line on the utility side of the meter 3114.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A coupling module for coupling a communication device to a medium voltage power line, comprising:
   a surge arrestor having a first side configured to be coupled to the medium voltage power line, said surge arrestor having a second side;
   a transformer having a first winding having a first end communicatively coupled to said second side of said surge arrestor;
   said first winding having a second end electrically connected to a ground conductor that extends between a plurality of utility poles;
   said transformer having a second winding communicatively coupled to the communication device; and
   wherein said first winding provides a portion of the only electrical path between said second end of said surge arrestor and the ground conductor.

2. The module of claim 1, wherein the communication device includes a housing and said transformer is disposed in said housing.

3. The module of claim 1, wherein said surge arrestor comprises an air-gap surge arrestor.

4. The module of claim 1, wherein said surge arrestor comprises a solid-state surge arrestor.

5. The module of claim 1, wherein the communication device comprises a powerline node.

6. The module of claim 1, wherein said first end of said first winding is communicatively coupled to said second side of said surge arrestor via a capacitor.

7. The module of claim 1, wherein the communication device comprises a first port configured to communicate via a fiber optic conductor.

8. The module of claim 1, wherein the communication device is configured to communicate data for one or more in-home end user devices.

9. The module of claim 1, wherein the communication device is configured to provide broadband communications over the medium voltage power line.

10. The module of claim 1, wherein the communication device is configured to communicate utility meter data.

11. The module of claim 1, wherein the communication device is configured to communicate over the medium voltage power line via carrier-sense multiple-access (CSMA) communications.

12. The module of claim 11, wherein the CSMA comprises CSMA with collision avoidance.

13. A communication assembly for communicating over a medium voltage power line, comprising:
   a communication device having a first port and a second port;
   a surge arrestor having a first side configured to be coupled to the medium voltage power line, said surge arrestor having a second side;
   a transformer having a first winding having a first end communicatively coupled to said second side of said surge arrestor;
   said first winding having a second end electrically connected to a ground conductor that extends between a plurality of utility poles;
   said transformer having a second winding communicatively coupled to said first port of said communication device; and
   wherein said first winding provides a portion of the only electrical path between said second end of said surge arrestor and the ground conductor.

14. The assembly of claim 13, wherein said communication device includes a housing and said transformer is disposed in said housing.

15. The assembly of claim 13, wherein said surge arrestor comprises an air-gap surge arrestor.

16. The assembly of claim 13, wherein said surge arrestor comprises a solid-state surge arrestor.

17. The assembly of claim 13, wherein said communication device comprises a powerline node.

18. The assembly of claim 13, wherein said first end of said first winding is communicatively coupled to said second side of said surge arrestor via a capacitor.

19. The assembly of claim 13, wherein said second port of said communication device is configured to communicate via a fiber optic conductor.

20. The assembly of claim 13, wherein said communication device is configured to communicate data for one or more in-home end user devices.

21. The assembly of claim 13, wherein the communication device is configured to provide broadband communications over the medium voltage power line.

22. The assembly of claim 13, wherein said communication device is configured to communicate utility meter data.

23. The assembly of claim 13, wherein said communication device is configured to communicate over the medium voltage power line via carrier-sense multiple-access (CSMA) communications.

24. The assembly of claim 22, wherein the CSMA comprises CSMA with collision avoidance.

25. The assembly of claim 13, wherein said second port of said communication device is configured to communicate wirelessly.

26. The assembly of claim 13, wherein said second port of said communication device is configured to communicate via a coaxial cable.

27. The assembly of claim 13, wherein said second port of said communication device is configured to communicate via a twisted pair conductor set.

28. The assembly of claim 13, wherein said transformer comprises an isolation transformer.

29. A communication assembly for communicating over a medium voltage power line, comprising:
   a communication device having a first port and a second port;
   wherein said communication device is configured to communicate utility meter data;
   a surge arrestor having a first side configured to be coupled to the medium voltage power line, said surge arrestor having a second side;
   a transformer having a first winding having a first end communicatively coupled to said second side of the surge arrestor;
   said first winding having a second end electrically connected to a ground conductor that extends between a plurality of utility poles;
   said transformer having a second winding communicatively coupled to said second port of said communication device; and
   wherein said first winding provides a portion of the only electrical path between said second end of said surge arrestor and the ground conductor.

30. The assembly of claim 29, wherein said communication device is configured to communicate data for one or more in-home end user devices.

31. The assembly of claim 29, wherein the communication device is configured to provide broadband communications over the medium voltage power line.

32. The assembly of claim 29, wherein said communication device is configured to communicate over the medium voltage power line via carrier-sense multiple-access (CSMA) communications.

* * * * *